(12) United States Patent
Sankaranarasimhan et al.

(10) Patent No.: US 9,483,388 B2
(45) Date of Patent: Nov. 1, 2016

(54) DISCOVERY OF APPLICATION STATES

(71) Applicant: Quixey, Inc., Mountain View, CA (US)

(72) Inventors: Manikandan Sankaranarasimhan, Fremont, CA (US); Kalyan Desineni, Mountain View, CA (US); Srinivasa Rao Ponakala, Sunnyvale, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

(21) Appl. No.: 14/585,120

(22) Filed: Dec. 29, 2014

(65) Prior Publication Data

US 2016/0188448 A1    Jun. 30, 2016

(51) Int. Cl.
*G06F 11/36* (2006.01)
*G06F 9/44* (2006.01)

(52) U.S. Cl.
CPC ............. *G06F 11/3688* (2013.01); *G06F 8/70* (2013.01)

(58) Field of Classification Search
None
See application file for complete search history.

(56) References Cited

U.S. PATENT DOCUMENTS

| 5,742,827 | A  | * | 4/1998  | Ohkubo  | G06F 8/10 717/111 |
| 2003/0225811 | A1 | * | 12/2003 | Ali     | G06F 8/10 718/101 |
| 2014/0007048 | A1 | * | 1/2014  | Qureshi | G06F 21/10 717/110 |

* cited by examiner

*Primary Examiner* — Lewis A Bullock, Jr.
*Assistant Examiner* — Bruce S Ashley
(74) *Attorney, Agent, or Firm* — Harness, Dickey & Pierce, P.L.C.

(57) ABSTRACT

Some aspects of the disclosure provide a method comprising obtaining machine executable code of an application, the application operable to achieve a set of application states, pre-processing the machine executable code to generate reviewable code, identifying, from the reviewable code, a set of state access instructions configured to invoke or assist in invoking one of the set of application states of the application, the set of state access instructions indicating a first state access instruction configured to invoke a first state of the set of application states and a second state access instruction configured to invoke a second state of the set of application states that is different from the first state, each of the set of state access instructions including an application resource identifier referencing an application and indicating an operation for the application to perform, and storing the set of state access instructions.

23 Claims, 14 Drawing Sheets

```xml
<?xml version="1.0" encoding="UTF-8"?>
<app pkg="com.eat24.app" name="Eat24" domain="eat24.com">
  <deepstate name="Menu"
    id="com.eat24.app_71_SplashActivity_MenuActivity_1">
    <note> Menu items </note>
    <trigger versionName="3.2.3" version="71" platform="Android">
      <description> Menu items </description>
      <intent target="com.eat24.app/com.eat24.app.activities.MenuActivity"
        outputscreen="com.eat24.app.activities.MenuActivity.png"
        inputscreen="com.eat24.app.activities.RestaurantInfoAndReviews.png" component="com.eat24.app/
        com.eat24.app.activities.SplashActivity">
        <extra value="0" type="java.lang.Integer"
          tags="type=int,assignedto=EXTRAS_KEY_ACTIVITYROLE "
          key="{EXTRAS_KEY_ACTIVITYROLE}"/>
        <extra value="32041" type="java.lang.Integer"
          tags="type=int,assignedto=EXTRAS_KEY_RESTAURANTID "
          key="{EXTRAS_KEY_RESTAURANTID}"/>
        <extra value=""Bawarchi"" type="java.lang.String"
          tags="type=String,assignedto=EXTRAS_KEY_RESTAURANTNAME "
          key="{EXTRAS_KEY_RESTAURANTNAME}"/>
        - <param name="{EXTRAS_KEY_ACTIVITYROLE}" value="0" type="java.lang.Integer" param-type="extra"
          optional="false" entity="">
          <description> ROLE </description>
        </param>
        - <param name="{EXTRAS_KEY_RESTAURANTID}" value="32041" type="java.lang.Integer" param-
          type="extra" optional="false" entity="">
          <description> Rest Id </description>
        </param>
        - <param name="{EXTRAS_KEY_RESTAURANTNAME}" value=""Bawarchi"" type="java.lang.String"
          param-type="extra" optional="false" entity="">
          <description> Rest name </description>
        </param>
      </intent>
      <result> Menu items </result>
    </trigger>
  </deepstate>
</app>
```

402 — `<?xml ...?>` `<app .../>`
404 — `<deepstate ...>`
406 — `<intent .../>`

FIG. 4

DISCOVERY OF APPLICATION STATES

TECHNICAL FIELD

The present disclosure generally relates to discovery of application states and, more particularly to techniques for determining instructions that can assist in invoking the discovered application states.

BACKGROUND

As mobile devices have become more capable and common, there has been increased use of and reliance on mobile applications (i.e., applications on the mobile devices). The number of applications, types of functionality, and amount of content provided by these applications has exploded. Further, new applications as well as updated versions of existing applications with new content are added every day.

Most application developers publish a list of instructions to control or configure the application in different ways. For example, many ANDROID applications include or are associated with an application manifest. The manifest includes information that the operating system may require before the application is executed. The manifest may also identify intents that may configure the application to reach desired content from the application. An intent in ANDROID is a messaging object that can be used to request an action from another application (or a component of an application).

Unfortunately, as applications have gotten more complex and the information provided by applications has grown, there may be any number of intents and different configurations that are not published by the application developer. The task of identifying intents and different application configurations is often too onerous and burdensome on the application developer.

SUMMARY

Some aspects of the disclosure provide an example method comprising obtaining machine executable code of an application, the application operable to achieve a set of application states, pre-processing the machine executable code to generate reviewable code, identifying, from the reviewable code, a set of state access instructions configured to invoke or assist in invoking one of the set of application states of the application, the set of state access instructions indicating a first state access instruction configured to invoke a first state of the set of application states and a second state access instruction configured to invoke a second state of the set of application states that is different from the first state, each of the set of state access instructions including an application resource identifier referencing an application and indicating an operation for the application to perform, and storing the set of state access instructions.

The method may further comprise identifying a candidate activity object from the reviewable code, the candidate activity object potentially functional to change or assist in changing an application state of the set of application states of the application. Further, the method may comprise tracing functions of the candidate activity object in the reviewable code to determine if the candidate activity object is functional to change or assist in changing the application state of the set of application states of the application, an application resource identifier of the first state access instruction indicating the candidate activity object based, at least in part, on the tracing. Tracing functions of the candidate activity object in the reviewable code may comprise identifying a pattern of activity associated with the candidate activity object from the reviewable code to determine if the candidate activity object is functional to change or assist in changing the application state of the set of application states of the application.

In some embodiments, the method may comprise tracing functions of a parameter variable associated with the candidate activity object from the reviewable code to determine if the parameter variable assists the candidate activity object in changing the application state of the set of application states of the application. Further, in various embodiments, the method further comprises determining semantic meaning of the parameter variable by tracing use of the parameter variable in the reviewable code. A category may be assigned to the parameter variable based on the semantic meaning, the category being associated with a plurality of preexisting values. Further, the method may comprise providing the first state access instruction to the application, the first state access instruction including the candidate activity object and at least one of the plurality of preexisting values.

In various embodiments, the reviewable code is machine readable. The first state access instruction may comprise a parameter variable utilized by the application resource identifier. In some embodiments, the first state access instruction may comprise a parameter value utilized by the application resource identifier. The method may further comprise generating a state access instruction report including the set of state access instructions.

An example system may comprise a pre-processing module, an object tracking module, and a static access instruction report module. The pre-processing module may be configured to obtain machine executable code of an application, the application operable to achieve a set of application states and pre-process the machine executable code to generate reviewable code. The object tracking module may be configured to identify, from the reviewable code, a set of state access instructions configured to invoke or assist in invoking one of the set of application states of the application, the set of state access instructions indicating a first state access instruction configured to invoke a first state of the set of application states and a second state access instruction configured to invoke a second state of the set of application states that is different from the first state, each of the set of state access instructions including an application resource identifier referencing an application and indicating an operation for the application to perform. The static access instruction report module may be configured to store the set of state access instructions.

An example non-transitory computer readable medium may comprise executable instructions. The executable instructions may be executable by a data processing device to perform a method. The method may comprise obtaining machine executable code of an application, the application operable to achieve a set of application states, pre-processing the machine executable code to generate reviewable code, identifying, from the reviewable code, a set of state access instructions configured to invoke or assist in invoking one of the set of application states of the application, the set of state access instructions indicating a first state access instruction configured to invoke a first state of the set of application states and a second state access instruction configured to invoke a second state of the set of application states that is different from the first state, each of the set of state access instructions including an application resource identifier referencing an application and indicating an operation for the application to perform, and storing the set of state access instructions.

BRIEF DESCRIPTION OF THE DRAWINGS

FIG. 4 is a portion of a state access instruction report in some embodiments.

Like reference symbols in the various drawings indicate like elements.

DETAILED DESCRIPTION

Figure 1:
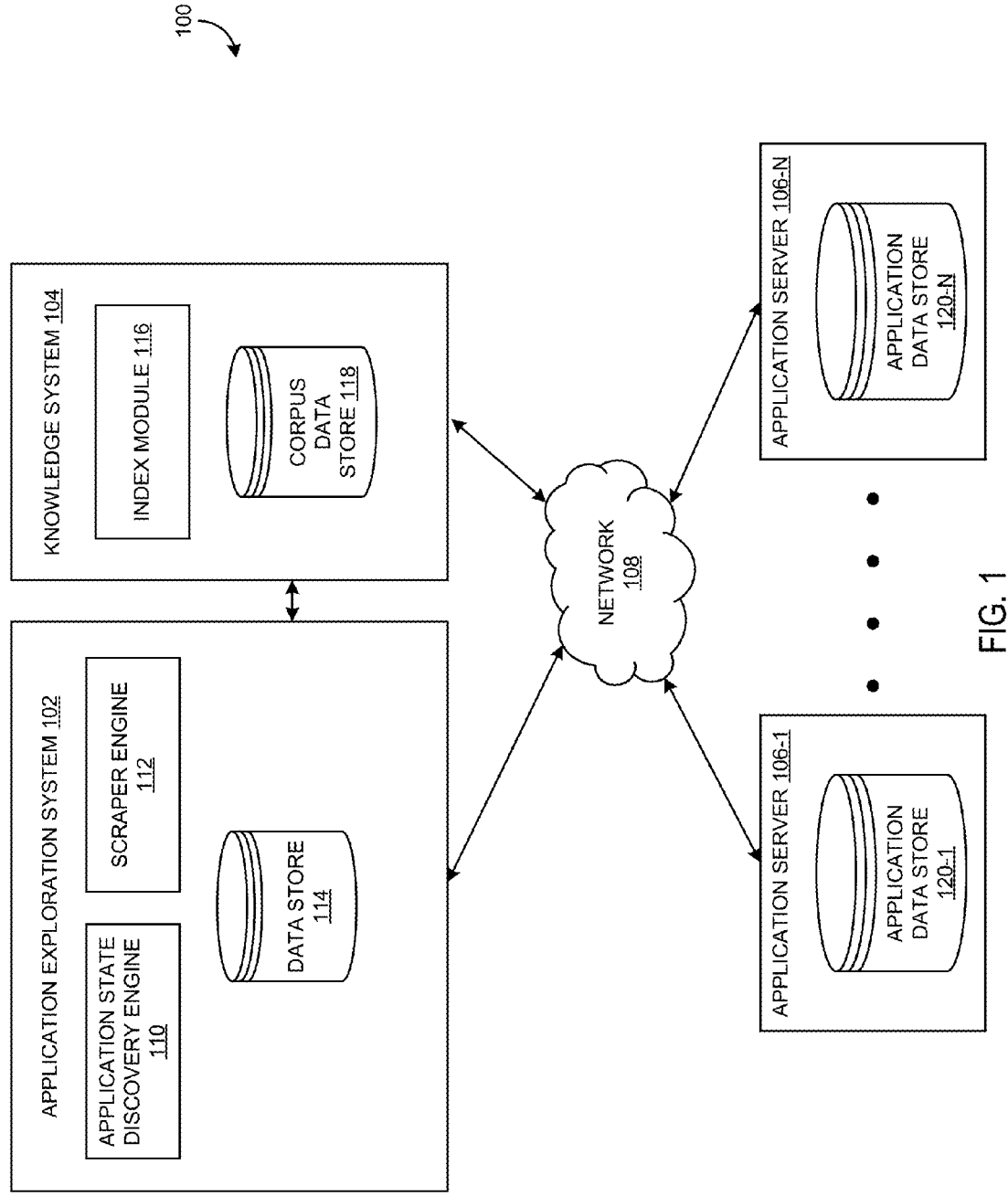
FIG. 1 is an illustration of an environment including an application exploration system, a knowledge system, and application severs each in communication over a network in some embodiments.

Software applications provide a considerable amount of content. Many applications require a user to navigate (e.g., press desired buttons or tabs) various screens provided by the application to achieve a desired application state where desired content is displayed. For example, a user may execute a review application on a mobile device and enter a type of food (e.g., American) and a zip code. A review application may be an application that enables users to receive reviews for businesses and services, such as restaurants, cleaning services, and the like. Upon entering a type of food and a zip code in a review application, the user may click a button or other icon to transition the review application from its initial screen (e.g., displayed by the review application when the application is in its initial application state) to a screen that displays a list of restaurants at the desired zip code (e.g., displayed by the review application when the application has been configured to a different application state using the entered restaurant type and zip code). Display of content by an application often depends on how the application is controlled, information from the user, and/or information from other applications and/or remote devices.

Some applications publish specific instructions to configure an application to an application state (e.g., a configuration of the application) to encourage users and/or other applications to configure the application to provide desired information. For example, many application developers create a publicly available manifest which includes, for example, ANDROID intent messages for the application. Each intent message may provide information to enable configuration of the application to one or more different application states. The information from the manifest may be used by users, applications, and/or services to improve accessibility and/or use of the application as well as application content. Not all application states for an application, however, are published by the application developer. For example, an application developer may create an application capable of achieving any number of states. The specific identification and publication of numerous states for an application by the application developer may be onerous and unwieldy.

Techniques are described for discovery of application states in an application. In various embodiments, the code of the application may be pre-processed and inspected to identify components of the code (e.g., objects) and usage that are linked to configuring the application to a different application state (e.g., a configuration of an application further described herein). In some embodiments, the application may be executed and the application configured (e.g., through the application graphical user interface or GUI). Commands to components and usage may be hooked or intercepted to identify code components and usage.

Once a component of the code and/or usage is identified, functional instructions may be created or generated to configure or assist in configuration of the application to the identified application state. In some examples, the functional instructions (e.g., state access instructions) may be used to direct users to desired content, to improve interoperability with other applications and services, display content, and/or provide improved access to content.

A software application may refer to computer software that causes a computing device to perform a task. In some examples, a software application may be referred to as an "application," an "app," or a "program." Example applications include, but are not limited to, word processing applications, spreadsheet applications, messaging applications, media streaming applications, social networking applications, and games.

Applications can be executed on a variety of different computing devices. For example, applications can be executed on mobile computing devices such as smart phones, tablets, and wearable computing devices (e.g., headsets and/or watches). Applications can also be executed on other types of computing devices having other form factors such as laptop computers, desktop computers, or other consumer electronic devices. In some examples, applications may be installed on a computing device prior to a user purchasing the computing device. In other examples, the user may download and install applications on the computing device.

The functionality of an application may be accessed on the computing device on which the application is installed. Additionally, or alternatively, the functionality of an application may be accessed via a remote computing device. In some examples, all of an application's functionality is included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the accessed weather information to the user through the installed weather application. In still other examples, an application (e.g., a web based application) may be partially executed by the user's computing device and partially executed by a remote computing device. For example, a web application may be an application that is executed, at least in part, by a web server and accessed by a web browser of the user's computing device. Example web applications may include, but are not limited to, web-based email, online auctions, and online retail sites.

An application state is a configuration of an application. For example, an application may store data in memory locations. The content of these memory locations, at a given point in the application's execution, is the application's state at that time. In various embodiments, an application may be configured to reach a particular state by a user that executes the application and navigates various interfaces to reach the desired application configuration (i.e., the desired application state). In another example, the application may receive instructions that call one or more functions and/or parameters (e.g., the instruction may include an ANDROID intent) that, when executed by the application, configures the application to an application state. An application may be configured to invoke or achieve an application state in any number of ways.

In various embodiments, an application may be configured to produce an output interface when the application is at a particular application state. The output interface is any output that the application may produce at that application state. For example, the output interface may include an html page or card that is displayable to a user of the digital device. The output interface may include functionality and/or content (e.g., maps and navigation, restaurant reviews, podcast information, or the like). Content is any information that provides value to a user. Examples of content may include descriptions, reviews, tutorials, email messages, GPS (global positioning system) coordinates, or the like. The application may provide different output interfaces at different application states (e.g., the application may provide different content at different application states).

Figure 14:
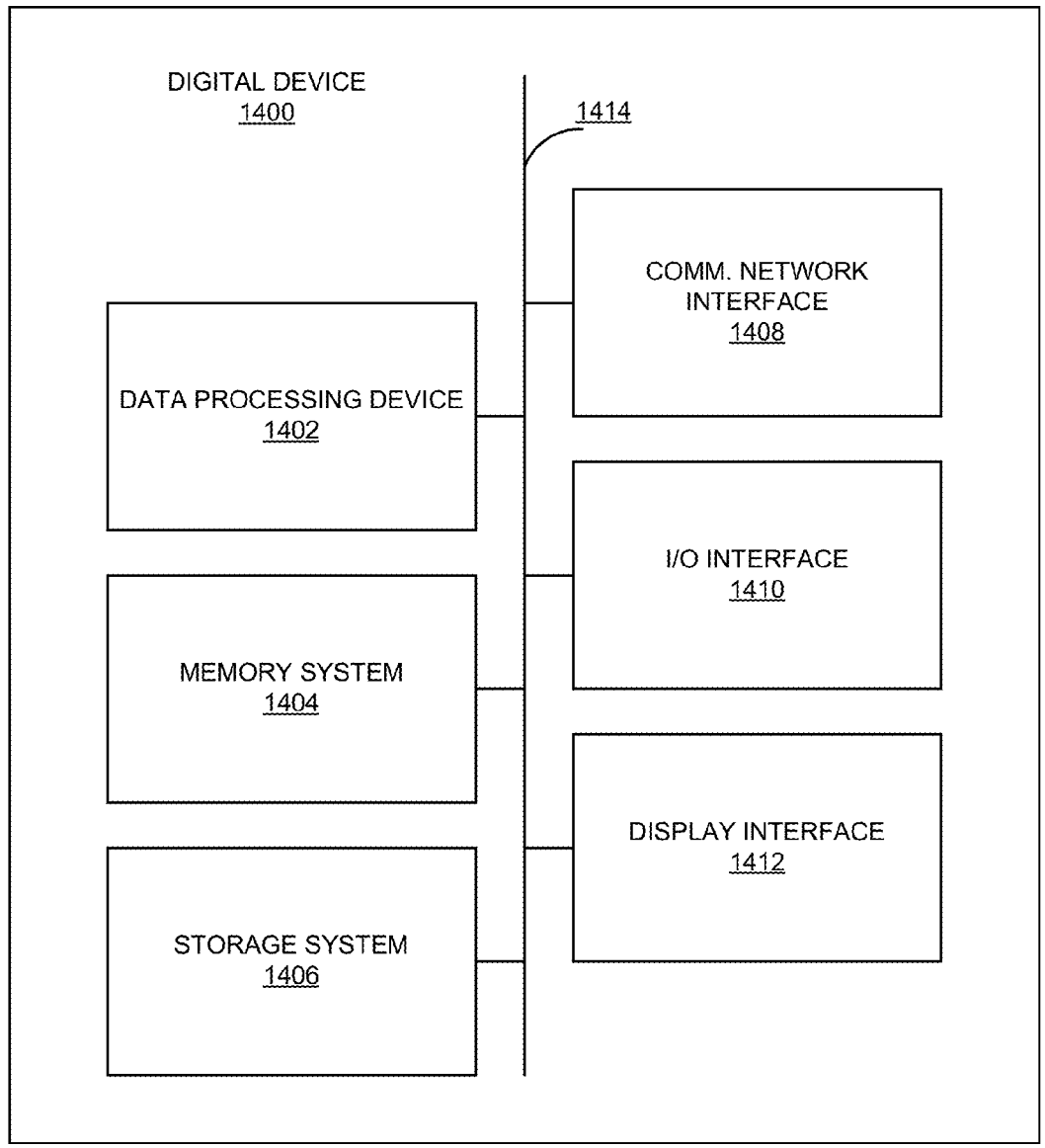
FIG. 14 is a block diagram of an exemplary digital device.

FIG. 1 is an illustration of an environment 100 including an application exploration system 102, a knowledge system 104, and application servers 106-1 . . . 106-N each in communication over a network 108 in some embodiments. The network 108 may include various types of networks, such as a local area network (LAN), a wide area network (WAN), and/or the Internet. The application exploration system 102, knowledge system 104, and application servers 106-1 . . . 106-N may be computing devices. A computing device (e.g., a digital device) is any device with a memory and a processor. An example of a digital device is depicted in FIG. 14.

The application exploration system 102 includes an application state discovery engine 110, a scraper engine 112, and a data store 114. In various embodiments, the application state discovery engine 110 is configured to discover any number of application states (e.g., possible configurations) of an application. Any number of the discovered application states may be associated with an output interface of the application. The output interface may include content that may be of value to a user, another application, service, or the like.

In some embodiments, once the application state discovery engine 110 discovers a desired application state (e.g., a configuration of an application), the application state discovery engine 110 may generate instructions (e.g., state access instructions) that, when executed, configures or assists in configuring the application to the desired application state. In one example, when the application is configured to achieve a particular application state using state access instructions, the application may display and/or generate an output interface to enable display of content.

The state access instruction may enable configuration of an application to access content from functionality of the configured application. In some embodiments, a state access instruction may include a string that includes a reference to an application installed on a user's device (e.g., mobile phone or the like described herein). The string may indicate one or more operations for the user device to perform. In various embodiments, the application may be launched and the application may perform one or more operations indicated in the state access instruction.

The state access instruction may include an application resource identifier and/or one or more operations for a user device to perform. For example, an application resource identifier may be a string having an application specific scheme. The application resource identifier may include a reference to a native application and indicate one or more operations for the application to perform. For example, the application resource identifier may include a reference to the application, a domain name, and a path to be used by the native application to retrieve and display information to the user.

In some examples, the state access instruction may include operations for the application to perform in addition to the operation(s) indicated in the application resource identifier. In some examples, the operations may be included in a script. Examples of operations may include, but are not limited to, launching the application, waiting for the application to start, creating and sending a search request to a server, setting a current geo-location in the application, making a restaurant reservation, sending a text message, and adding an appointment to a calendar.

A state access instruction may be, for example, an application state access mechanism described herein.

State access instructions may include an application resource identifier and any associated parameter values (if any). In some embodiments, the state access instructions may include template function instructions. The application resource identifier may include, for example, instructions that identify or refer to a component of an application to perform an activity or service. Parameter values are any values that may be passed to the component of the application. In one example, an application resource identifier may identify or call a component within a review application that ultimately displays restaurants. The state access instructions may include a parameter value including a zip code for New York City. In this example, the state access instruction calls a component within the review application to perform a function utilizing the provided parameter function in order to configure the review application to display a list of restaurants in New York City.

In some embodiments, state access instructions include a template function instruction that includes an application resource identifier as well as one or more parameter variables. A parameter variable is any indicator or reference to a parameter value.

The data store 114 may be any memory configured to store, for example, state access instructions, template function instructions of state access instructions, application resource identifiers, parameter variables, and/or parameter values. The corpus data store 118 may also store content and/or UI elements.

The application exploration system 102 may further include a scraper engine 112. In various embodiments, the scraper engine 112 may be configured to gather content from any number of applications. In some embodiments, an application may be configured to a specific application state using a state access instruction discovered by the application state discovery engine. The scraper engine 112 may subsequently copy content from an output interface generated by the application at that application state. The scraper engine 112 may copy any content including, but not limited to, text, images, audio, video, or the like.

In some embodiments, the scraper engine 112 may also scrape user interface (UI) elements from the output interface. UI elements are those elements used in an interface (e.g., a graphical user interface or GUI) that represent information indicated in that interface. UI elements may indicate content (e.g., text, image, audio, video, animation, or any media either locally stored or retrievable over a network). In one example when the output interface is coded in xml, a UI element may indicate content by defining TextView as android:text="Restaurant review for ALEXANDER'S STEAKHOUSE is five stars." In various embodiments, the UI element may include a link to another application, data store, and/or a remote digital device to retrieve content to be shared with the user UI elements may indicate and/or describe functionality (e.g., buttons, scroll bars, tabs, or the like). For example, UI elements for a particular output interface may indicate a window for content and a scroll bar associated with that window which may change the content of the window when actuated (e.g., when the window scrolls as a result of activation of the scroll bar).

In various embodiments, the scraper engine 112 may scrape an output interface depending on the UI element(s). For example, the scraper engine 112 may identify a UI element and perform functions based on the type of UI element. In some embodiments, each UI element may be associated with any number of scraper instructions. The scraper engine 112 may scrape content associated with a UI element based on the scraper instructions. Since not all UI elements may be associated with content, there may be scraper instructions that instruct the scraper engine 112 to take no action or to scan for a different UI element.

The knowledge system 104 may include index module 116 and corpus data store 118. The knowledge system 104 may be configured to store state access instructions from the application state discovery engine 110, content and/or UI elements copied from the scraper engine 112 or the like. For example, the index module 116 may index and/or categorize information identified by the application exploration system 102. In some embodiments, the index module 116 indexes state access instructions, template function instructions of state access instructions, application resource identifiers, parameter variables, and/or parameter values. The index module 116 may index and/or categorize information identified by the scraper engine 112 including content and/or UI elements. In various embodiments, the index module 116 may index, categorize, or otherwise associate information from the scraper engine 112 with information from the application state discovery engine 110. In some embodiments, the index module 116 may index, categorize, or otherwise associate state access instructions, template function instructions of state access instructions, application resource identifiers, parameter variables, and/or parameter values with each other.

The corpus data store 118 may be any memory configured to store, for example, state access instructions, template function instructions of state access instructions, application resource identifiers, parameter variables, and/or parameter values. The corpus data store 118 may also store content and/or UI elements.

The application servers 106-1 . . . 106-n are any digital devices that may include application data store 120-1 . . . 120-n, respectively. In various embodiments, the application servers 106-1 . . . 106-n may provide information to an application. For example, the review application may retrieve information from the application data store 120-1 to display to a user. In another example, if the review application is configured (e.g., using a state access instruction) to a particular application state, the review application may generate an output interface and display information from the application server 106-1 in the output interface.

Modules, engines, and data stores included in the application exploration system 102 knowledge system 104, and elsewhere in the description, represent features. The modules and data stores described herein may be embodied by electronic hardware (e.g., an ASIC), software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

Figure 2:
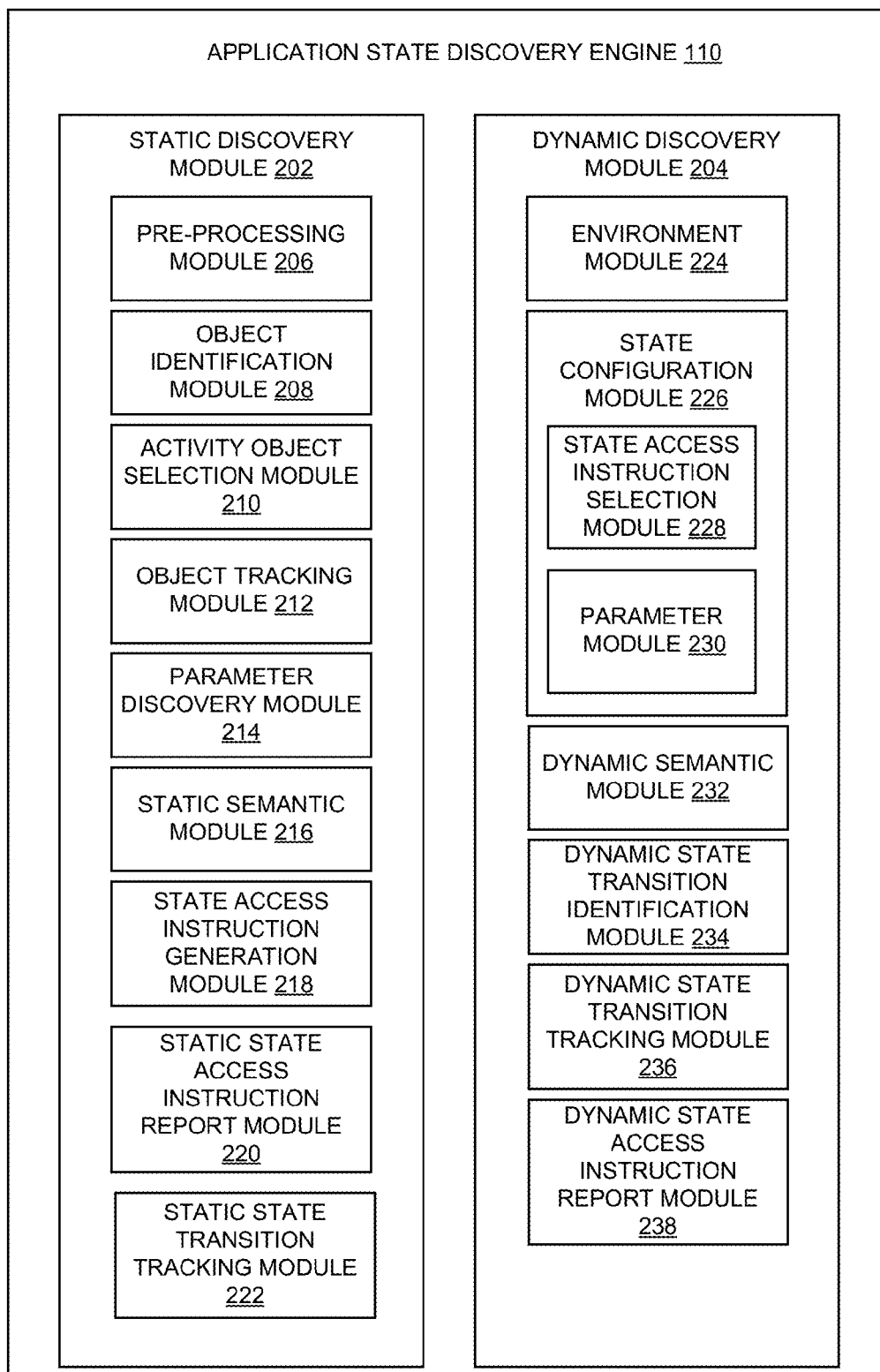
FIG. 2 is an illustration of an example application state discovery engine in some embodiments.

FIG. 2 is an illustration of an example application state discovery engine 110 in some embodiments. The application state discovery engine 110 may comprise a static discovery module 202 and a dynamic discovery module 204. In various embodiments, the static discovery module 202 may discover application states of an application by inspecting all or some code of the application. For example, an application developer may provide source code or any other code which may be inspected and/or scanned for information indicative of an application state or application state change.

In another example, the static discovery module 202 may decompile and/or perform other pre-processing of an application to generate a reviewable code which may be subsequently inspected and/or scanned. The following are examples of application state discovery in reviewable code. It will be appreciated that the following examples and embodiments discussed herein is not limited to pre-processed (e.g., reviewable) code but may be any code including, for example, code that has not been decompiled and/or otherwise pre-processed (e.g., code provided by the application developer or otherwise obtained elsewhere).

In some embodiments, the static discovery module 202 may identify classes from the pre-processed code and scan functions related to the classes to identify either creation or passage of an activity object (e.g., an intent object). The activity object may be created by the pre-processed code or received from another source (e.g., operating system, another application, and/or another device). The static discovery module 202 may track variables associated with the activity objects including, for example, how they are assigned or used. A variable may reference a stored value. The static discovery module 202 may identify parameter variables from the tracked variables. A parameter variable is a variable that is utilized by the activity function to configure the application into another (or desired) state. The static discovery module 202 may generate a state access instruction based on the identified activity object and related parameter variable(s) (if any).

The static discovery module 202 may comprise a pre-processing module 206, an object identification module 208, an activity object selection module 210, an object tracking module 212, a parameter discovery module 214, a static semantic module 216, a state access instruction generation module 218, a static state access instruction report module 220, and a static state transition tracking module 222.

The pre-processing module 206 may be configured to pre-process an application code to a reviewable code. The reviewable code may be in any language. In some embodiments, the pre-processing module 206 decompiles and/or performs other pre-processing of the application code to generate a reviewable code that is machine readable. The reviewable code may be human readable and/or machine readable. For example, the reviewable code may be coded in the java programming language and/or XML. The pre-processing module 206 may be or include any decompiler, translator, parser, and/or the like.

In some embodiments, the pre-processing module 206 may decompress, extract, and/or separate code. For example, the pre-processing module 206 may disassemble and extract components from an ANDROID application package (APK). The APK is a package file format used to distribute and install application software onto a digital device with an ANDROID operating system. To make an APK file, an application for ANDROID is first compiled and then its parts are packaged into the file. The APK may contain all of the program's code (such as .dex files), resources, assets, and the manifest file. An APK file is a type of archive file.

The pre-processing module 206 may decompress some or all of an application. For example, the pre-processing module 206 may decompress some or all of an APK file (e.g., decompress the APK file). The pre-processing module 206 may extract the desired program's code (e.g., extract the .dex files from the decompressed APK package).

In various embodiments, the pre-processing module 206 decompiles the program's decompressed and/or extracted code into the reviewable format. The pre-processing module 206 may further parse the code for further analysis. For example, the pre-processing module 206 may segment and/or otherwise separate the code to enable scanning or pattern matching (e.g., to identify desired activity objects).

The object identification module 208 and/or the activity object selection module 210 may identify activity objects and/or candidate activity objects from the reviewable code. An activity object is an object identified in the reviewable code that is used to change the application state (e.g., reconfigure) the application. In various embodiments, an activity object is an object that reconfigures the application to an application state that enables access to or display of content. A candidate activity object may be an object identified in the reviewable code but has not yet been determined if the identified object changes the application state of the application and/or if the identified object reconfigures the application to an application state that enables access to or display of content. It will be appreciated that there may be any number of activity objects that do not change the application state of the application or changes the application state of the application in a manner that does not lead to valuable content and/or functionality.

In some embodiments, the object identification module 208 may identify classes within the reviewable code to identify creation of a candidate activity object. The object identification module 208 may, in some embodiments, identify candidate activity objects that are to be received by the application through inspection of the reviewable code.

In various embodiments, the object identification module 208 may utilize pattern matching (e.g., syntactic pattern matching) to identify patterns of code segments that serve as entry and exit points to functions performed by the applications. For example, the object identification module 208 may identify activity objects and/or candidate activity objects based on patterns such as API calls, usage of components, and/or other functionality. In one example, a pattern may identify and/or isolate one or more functions which may be public (e.g., publicly exposed triggers to activate) and/or private.

In some embodiments, the object identification module 208 may retrieve pattern matching rules from the data store 114. The object identification module 208 may scan the reviewable code to identify code (e.g., including references to candidate activity objects) that matches one or more of the pattern matching rules in order to identify an activity object. In one example, one or more pattern matching rules may identify API calls in general (or specific API calls) and/or usage of components.

For example, the object identification module 208 may perform forward or backward analysis. In forward analysis, the object identification module 208 may initiate a process where a starting point for a pattern (e.g., the beginning of a process that may change the application state of the application) is recognized in the reviewable code (e.g., identifying a candidate activity object, an API call, or other functionality). The object identification module 208 may subsequently scan and/or review the reviewable code for other functionality that further matches the pattern until the pattern is matched. Once the pattern is matched, the activity object selection module 210 may identify the activity object and any parameter variables used in changing the application state.

In backward analysis, the object identification module 208 may start with an exit point (e.g., the ending of a process that changes the application state of the application) for a pattern that is recognized in the reviewable code. The object identification module 208 may subsequently scan and/or review the reviewable code for other functionality that further matches the pattern until the pattern is matched. As similarly discussed regarding forward analysis, once the pattern is matched, the activity object selection module 210 may identify the activity object and any parameter variables used in changing the application state.

In various embodiments, the object identification module 208 and/or the activity object selection module 210 may determine (e.g., using pattern matching) which activity objects change the application state of the application to a configuration that enables display of or otherwise provides content or functionality. The object identification module 208 and/or the activity object selection module 210 may ignore or otherwise filter out activity objects that do not change the application state of the application. Similarly, the object identification module 208 and/or the activity object selection module 210 may ignore of otherwise filter activity objects that change the application state of the application to a state that does not provide or enable providing content and/or functionality.

Although the object identification module 208 and/or the activity object selection module 210 are discussed herein as selecting activity objects and/or identifying candidate activity objects from the reviewable code, it will be appreciated that the activity objects may be selected and/or candidate activity objects identified in any number of ways. In various embodiments, the object identification module 208 and/or the activity object selection module 210 may utilize any function, formula, or the like to select activity objects and/or consider candidate activity objects. In some embodiments, a person may select any number of activity objects and/or identify candidate activity objects through review of the reviewable code.

The object tracking module 212 and the parameter discovery module 214 may be configured to identify parameter variables that are used by the activity objects to configure the application to another application state. In various embodiments, once an activity object is identified and/or selected, the object tracking module 212 may track the use of parameter variables (e.g., any variables) that are created and/or used by the activity object. The object tracking module 212 may trace the use of parameter variables in the reviewable code by the activity object to determine the functions of the activity object, the type of parameter variables, how the parameter values are used, and the effect of the parameter values.

In one example, the object tracking module 212 may review the reviewable code to track variables that the activity object stores in memory (e.g., in a memory register). The object tracking module 212 may track the variables stored in memory and how the variables impact functionality. For example, the reviewable code may indicate that the activity object stores a parameter variable in a particular memory register. The object tracking module 212 may track how that memory register is to be used in the reviewable code. The object tracking module 212 may, for example, review the reviewable code to determine if the contents of the particular memory register are overwritten, the subject of mathematical functions, copied, used in other objects, or the like. By tracing the use of the variables of an activity object in the reviewable code, the object tracking module 212 and/or the parameter discovery module 214 may determine which variables are needed by the activity object to transition the application state of the application (e.g., which variables are parameter variables used with or by the activity object to transition to a new application state).

In various embodiments, the parameter discovery module 214 may identify any number of parameter variables that the reviewable code indicates are used by the activity object to configure the application to an application state. The parameter discovery module 214 may, based on the tracking of the object tracking module 212, identify any number of parameter variables.

The static semantic module 216 may be configured to discover semantic information (e.g., meanings, categories, labels, and/or the like) of the function of an activity object and/or any related parameter variables. In various embodiments, the static semantic module 216 may scan the reviewable code and/or utilize information from the object identification module 208, the object tracking module 212, and/or the parameter discovery module 214 to provide semantic information associated with the activity object and/or parameter variables.

For example, the static semantic module 216 may scan the reviewable code to determine how an activity object is used and the functions that the activity object performs. The static semantic module 216 may, based on the reviewable code, provide a description describing any number of functions and/or results associated with the activity object. In one example, the static semantic module 216 may utilize semantic rules (e.g., retrieved from the data store 114). The static semantic module 216 may compare the function and/or output of an activity object to conditions indicated by one or more of the semantic rules. The semantic rules that identify any number of descriptions or identifiers that provide semantic meaning to those activity objects with functions and/or output that meets the conditions identified by the semantic rule(s).

In various embodiments, the static semantic module 216 may summarize or otherwise provide information regarding functions and/or output of any number of activity objects to a user (e.g., administrator), another application, or operating system to enable semantic meaning regarding the activity function to be assigned, characterized, and/or provided.

In some embodiments, semantic meaning of the activity object and any parameter variables may allow for efficient storage and retrieval of information from the knowledge system 104. For example, the semantic meaning of output or functionality of an activity object allow for the activity object, associated parameter value(s), instructions indicating the activity object and associated parameter value(s), to be associated with and stored in the knowledge system 104. In some embodiments, the static semantic module 216 may identify semantic meaning and/or attributes associated with semantic meaning based on how the activity object is defined or usage of parameter values, functionality, and/or output indicated in the reviewable code. The static semantic module 216 may associate descriptions, identifiers, or the like (e.g., semantic meaning) with any number of categories such as tags. The categories may be associated with or similar to categories utilized in the knowledge system 104 or any data store (e.g., search system described herein).

The static semantic module 216 may summarize or otherwise provide information regarding any number of parameter variables to a user (e.g., administrator), another application, or operating system to enable semantic meaning of the parameter variables to be assigned, characterized, and/or provided.

In some embodiments, the semantic meaning of parameter variables are associated with and stored in the knowledge system 104. The static semantic module 216 may associate descriptions, identifiers, or the like (e.g., semantic meaning of parameter variables) with any number of categories such as tags. The categories may be associated with or similar to categories utilized in the knowledge system 104.

The static semantic module 216 may identify parameter values associated with parameter variables from the reviewable code. In some embodiments, the static semantic module 216 may review or scan the reviewable code for parameter values or indications of parameter values associated with the parameter variables. The static semantic module 216 may, for example, identify parameter values or at least attributes of parameter values based on definitions of parameter variables (e.g., integers, strings, or the like) and/or use of parameter variables. Further, the static semantic module 216 may identify parameter values based on indications of the reviewable code of use of parameter values and functionality of the associated activity object.

The state access instruction generation module 218 may be configured to generate state access instructions based on the activity object identified by the object identification module 208 and/or the activity object selection module 210. Further, the state access instruction generation module 218 may generate the state access instructions based on any parameter variables identified by the parameter discovery module 214 that is associated with the activity object.

The state access instruction generation module 218 may generate state access instructions including, but not limited to template function. As discussed herein, a template function instruction is an instruction that indicates the activity object (e.g., an application resource identifier) and includes associated parameter variables (if any). The template function instruction may be machine readable code. In some embodiments, the parameter variables are associated with any number of parameter values. For example, the parameter variables may indicate or be associated with a set of parameter values such as a set of parameter values maintained by the knowledge system 104 or other system. In some embodiments, the parameter variables are not associated with any parameter values. Parameter variables may be associated with parameter values at any time (e.g., by the application state discovery engine 110, an administrator, an application, another device, or the like).

The state access instruction generation module 218 may generate state access instructions that include references to the activity object (e.g., the application resource identifier) and any associate parameter values (i.e., not parameter variables).

The state access instruction generation module 218 may generate state access instructions in any format or language. In some embodiments, the state access instruction generation module 218 generates each state access instruction in a language and/or in a format that is understandable by an application.

In various embodiments, a state access instruction generated by the state access instruction generation module 218 may be used to configure an application to a particular application state. The application may, as a result of being configured to the particular application state, provide content or other functionality.

The static state access instruction report module 220 may generate a state access instruction report including any number of state access instructions provided by the state access instruction generation module 218. The static state access instruction report may include a list of state access instructions. In one example, the static state access instruction report may include one or more template function instructions having application resource identifiers and/or parameter variables. In another example, the static state access instruction report may include one or more state access instructions having application resource identifiers and/or parameter values. The static state access instruction report may be formatted in XML. An example portion of a static application state instruction report is depicted in FIG. 4 which is further discussed herein.

The static state transition tracking module 222 may be configured to track which application state associated with state access instructions are accessible (e.g., without privileges). For example, as discussed herein, a manifest file may indicate published, available intents that may be used to configure an application to a particular application state. The intents identified by the manifest file may configure the application without requiring privileges (e.g., the state of the application is directly accessible without privileges). Other application states (e.g., other intents) may not be accessed without privileges unless manually navigating the application. For example, an application may require privileges or other requirements before allowing the application to be reconfigured using a state access instruction.

In various embodiments, the static state transition tracking module 222 may review the reviewable code (e.g., including the function of activity objects and/or parameter variables in the reviewable code) to determine which application states are accessible without privileges (e.g., determining if privileges are required to execute a class, activity object, activity object functionality, and/or parameter variables). If a state access instruction is associated with an application state that is not accessible without privileges, then the static state transition tracking module 222 may flag the state access instruction with an indication that the associated state may not be directly accessed.

The dynamic discovery module 204 may execute the application to enable identification of semantic meaning for activity objects and/or parameter variables. In one example, a state access instruction may be utilized to configure an application to a particular application state. The application may, once configured, provide an output interface including content. The content may, in some examples, be from the application, retrieved by the application locally to display in the output interface, or received from another source (e.g., an application server such as application server 106-1). A user and/or the dynamic discovery module 204 may associate the state, activity object, state access instructions and/or the like with semantic meaning based, in part, on the output interface and/or content of the output interface. Similarly, a user and/or the dynamic discovery module 204 may, in some examples, associate parameter variables and/or parameter values with semantic meaning based on the application, application usage, output interface, and/or content.

In some embodiments, the dynamic discovery module 204 may execute the application to identify previously undiscovered application states and/or identify activity objects. In one example, an administrator or another application (e.g., automated function) may navigate the application to achieve different application states. The dynamic discovery module 204 may monitor commands, the operation of the application, and parameters. If a new application state is identified, the dynamic discovery module 204 may generate a state access instruction (e.g., template) associated with the new application state. The state access instruction may be included within or added to a state access instruction report as previously discussed herein.

The dynamic discovery module 204 may comprise an environment module 224, a state configuration module 226, a dynamic semantic module 232, a dynamic state transition identification module 234, a dynamic state transition tracking module 236, and a dynamic state access instruction report module 238. The state configuration module 226 may comprise a state access instruction selection module 228 and a parameter module 230.

The environment module 224 may create, provision, and/or enable an environment to run the application. In some embodiments, the environment module 224 may provide emulation and/or virtualization. In various embodiments, the environment module 224 may provide an environment without emulation or virtualization (e.g., a digital device running an operating system such as a mobile device running the ANDROID OS).

In various embodiments, the environment module 224 is configured to run and monitor the application in an emulated environment whereby mobile device hardware is simulated in software. For example, the application may run in the emulated environment as if the application was on a mobile device (e.g., running the ANDROID OS). The emulated environment may allow the application to have direct memory access (e.g., a bare metal environment). The behavior of the application may be monitored and/or tracked to track function operations and data stored in memory (e.g., track application behavior including memory registers, functions, APIs, and the like). For example, the emulated environment may track what resources (e.g., applications and/or operating system files) are called in processing by the application as well as what data is stored.

In some embodiments, the environment module 224 may be configured to run and monitor the application in a virtualization whereby some parts of the mobile device hardware may be simulated. The virtualization may track application behavior including memory registers, functions, APIs, and the like. For example, the virtualization environment may track what resources (e.g., applications and/or operating system files) are called in processing by the application as well as what data is stored.

In various embodiments, a single digital device may run in any number of virtualized environments as if each application was on a mobile device. The application may be instantiated in each environment. A different state access instruction may be utilized to configure the application to different application states in different environments (e.g., in parallel) thereby achieving scalability. Similarly, any number of emulated environments may be created. The application may be instantiated in each environment and different state access instructions utilized to configure the application to different states in parallel. Further, in some embodiments, the same application may be instantiated in both emulation and virtualization environments.

The state configuration module 226 may configure the application within the environment to an application state. For example, the state configuration module 226 may provide or execute a state access instruction (e.g., a template function instruction) to configure the application to the desired application state. The application may be configured and subsequently generate, in one example, an output interface that may display content, indicate functionality, or the like. In some embodiments, the application may retrieve content from any source such as a remote server (e.g., application server 106-1) to display in the output interface. It will be appreciated that content provided by an application at a particular application state may be unknown based on the reviewable code. By running and configuring the application to a particular application state in an environment (e.g., provided by the environment module 224), the application state, related activity object, parameter variables, parameter values, content, and/or the like may be better understood. As a result, the application state, related activity object, parameter variables, parameter values, content, and/or the like may be better described (e.g., associated with categories and/or tags based on semantic meaning).

The state configuration module 226 may include a state access instruction selection module 228 and a parameter module 230. The state access instruction selection module 228 may retrieve a state access instruction report and/or a state access instruction from the state access instruction report (e.g., generated or otherwise provided by the static discovery module 202) to configure the application in the environment. The state access instruction selection module 228 may utilize any number of the state access instructions and/or select any or all of the state access instructions in any order.

Once a state access instruction is selected by the state access instruction selection module 228, the parameter module 230 may retrieve and/or provide any values associated with any parameter variables indicated by the state access instruction. For example, the parameter module 230 may receive semantic information, categories (e.g., tags) or the like associating one or more parameter variables with one or more parameter values (e.g., any of a set of parameter values stored in the knowledge system 104). The parameter module 230 may provide any number of parameter values to the state access instruction, the application, environment, or the like to assist in configuration of the application.

For example, the state access instruction may include instructions to configure an application to provide restaurant reviews. The parameter module 230 may identify a parameter variable of the state access instruction and retrieve one or more parameter values (e.g., zip codes) from the knowledge system 104 to provide to the application with the instructions. Subsequently, the application may be configured to provide restaurant reviews for the zip code provided by the parameter module 230.

The dynamic semantic module 232 may be configured to discover semantic information (e.g., meanings, categories, labels, and/or the like) of the function of an activity object and/or any related parameter variables from the dynamic environment. The dynamic semantic module 232 may provide semantic information associated with the activity object, parameter variables, state access instruction, output interface, parameter values, or the like.

For example, the dynamic semantic module 232 may scan an output interface provided by the application that is configured to a particular application state. The dynamic semantic module 232 may, based on content of the output interface, provide a description describing any number of functions and/or results associated with the application state. In one example, the dynamic semantic module 232 may utilize semantic rules (e.g., retrieved from the data store 114). The dynamic semantic module 232 may compare the function and/or output of the application to conditions indicated by one or more of the semantic rules. The semantic rules that identify any number of descriptions or identifiers that provide semantic meaning to those states or related activity object, parameter variables, state access instruction, output interface, and/or parameter values.

In some embodiments, the dynamic semantic module 232 may collect or identify a subset of parameter values (e.g., a seven digit number) which may indicate the type of information needed to transition application states. For example, the dynamic semantic module 232 may indicate or display a sample parameter value to a user who can assign a description or describe the meaning of the sample parameter value (e.g., the user assigns the tag "zip code" to the parameter variable and/or value based on the sample).

In various embodiments, the dynamic semantic module 232 may receive semantic information from a user such as an administrator. For example, the application may be display an output interface to the user. The user may provide the dynamic semantic module 232 with any indication, meanings, descriptions, identifiers, or the like to provide semantic meaning. In some embodiments, the administrator may further provide information associating the semantic meaning with categories of the knowledge system 104. The dynamic semantic module 232 may associate or store state access instructions, state access instruction reports, parameter variables, parameter values, and/or the like in the knowledge system 104.

As discussed herein, semantic meaning of the activity object and any parameter variables may allow for efficient storage and retrieval of information from the knowledge system 104. For example, the semantic meaning of output or functionality of an activity object allow for the activity object, associated parameter value(s), instructions indicating the activity object and associated parameter variable(s), are associated with and stored in the knowledge system 104. The dynamic semantic module 232 may associate descriptions, identifiers, or the like (e.g., semantic meaning) with any number of categories such as tags. The categories may be associated with or similar to categories utilized in the knowledge system 104.

The dynamic semantic module 232 may summarize or otherwise provide information regarding any number of parameter variables to a user (e.g., administrator), another application, or operating system to enable semantic meaning of the parameter variables to be assigned, characterized, and/or provided.

In some embodiments, the semantic meaning of parameter variables are associated with and stored in the knowledge system 104. The dynamic semantic module 232 may associate descriptions, identifiers, or the like (e.g., semantic meaning of parameter variables) with any number of categories such as tags. The categories may be associated with or similar to categories utilized in the knowledge system 104.

The dynamic state transition identification module 234 may identify new application states based on execution, configuration, and reconfiguration of an application in the environment. In some embodiments, the environment enables a user to interact with an application. The interaction may configure the application to reach a new, previously unpublished, application state. It will be appreciated that the dynamic state transition identification module 234 may track and identify function calls, activity objects, parameter variables, parameter values, and/or the like. The dynamic state transition identification module 234 may track activity objects, parameter variables, and/or parameter values associated with the configuring the application to the application state. Subsequently, the dynamic state transition identification module 234 may generate and/or store a state access instruction that may be utilized to return the application to the previously undiscovered application state. The dynamic state transition identification module 234 may include the new state access instruction in the state access instruction report.

In various embodiments, the dynamic state transition identification module 234 may inspect execution of code in runtime. In some embodiments, the dynamic state transition identification module 234 may hook various APIs, collect parameters, and/or collect interprocess communication messages to identify new application states and provide context for application states, parameters, and/or the like. The dynamic state transition identification module 234 may perform application level and/or operating system level hooking. In some embodiments, the dynamic state transition identification module 234 may identify an object passing into the application. The dynamic state transition identification module 234 may analyze the object and context to better understand the object.

The dynamic state transition tracking module 236, similar to the static state transition tracking module 222, may be configured to track which application state associated with state access instructions are accessible (e.g., without privileges) and which may be indirectly accessible (e.g., manual navigation of the application and/or having privileges). Application states that may be directly accessed (e.g., using a state access instruction, the application may be configured to a particular application state without privileges) or indirectly accessed (e.g., requiring operating system privileges or navigation of the application in a manner that may be similar to a user). In various embodiments, the dynamic state transition tracking module 236 tracks and/or provides an indication whether any number of state access instructions of the state access instruction report allow for direct access to an application state or allow for indirect access to the application state. The dynamic state transition tracking module 236 may track and/or determine if an application state associated with an activity object is directly accessible or indirectly accessible based on the execution, configuration, and reconfiguration of the application.

The dynamic state access instruction report module 238 may be configured to generate access instructions (e.g., for a previously undiscovered application state that is discovered while the application is executed in the environment) and/or provide any additional information in the state access instruction report. In one example, the dynamic application state instruction report module 238 associates parameter variables of state access applications with parameter values of the knowledge system 104 and stores the association (e.g., stores links between the parameter variable and the parameter values of the knowledge system 104) in the state access instruction report.

Figure 3:
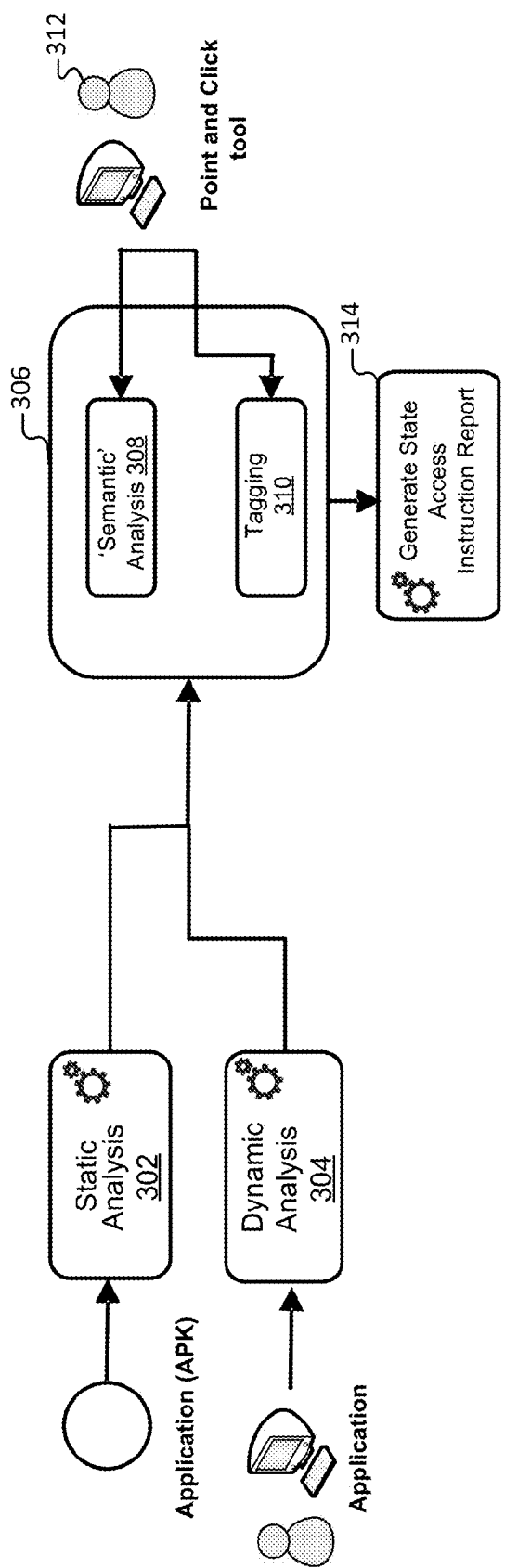
FIG. 3 is a diagram of the generation of the state access instruction report and semantic meaning in some embodiments.

FIG. 3 is a diagram of the generation of the state access instruction report and semantic meaning in some embodiments. In FIG. 3, static analysis 302 may be performed on an application APK. As discussed herein, static analysis 302 may comprise pre-processing (e.g., decompiling, decompressing, parsing, and/or the like) all or some of the APK (e.g., dex files of the APK) to a reviewable code. The reviewable code may also be machine readable code. During static analysis 302, the code may be reviewed for activity objects (e.g., intents) that may configure the application to an application state. The state and/or activity object may not have been previously published by the application developer (e.g., the application state and/or activity object may not have been indicated in the Application's manifest file).

Subsequently or in parallel with the static analysis 302, a dynamic analysis 304 may be performed on the application. For example, an emulated environment may be created and an instance of the application instantiated. Since the environment is emulated, the application may perform as if the application was installed on a mobile device. Further, the emulated environment may monitor interactions with hardware, memory registers, and the like. As a result, the emulated environment may identify instructions and/or parameter values that configure the application to a previously undisclosed state.

Determining meaning (e.g., description or assignment of identifiers such as tags) 306 may include semantic analysis 308 and/tagging 310. In various embodiments, an administrator 312 or other user may view output (e.g., an output interface) from the application in the dynamic analysis 304 and provide semantic meaning associated with the application state, activity objects called to obtain the application state, parameter variables, example parameter values, content, and/or the like. The administrator 312 or any other entity (e.g., application, server, device, or the like) may associate the application state, activity objects called to obtain the application state, parameter variables, example parameter values, content, and/or the like with categories or tags 310. In some embodiments, the categories or tags 310 are associated with the knowledge system 104.

In some embodiments, the administrator 312 or other user may view the reviewable code in the static analysis 302 and provide semantic meaning associated with the application state, activity objects called to obtain the application state, parameter variables, example parameter values, content, and/or the like as similarly discussed regarding the dynamic analysis 304. The administrator 312 or any other entity (e.g., application, server, device, or the like) may associate the state, activity objects called to obtain the application state, parameter variables, example parameter values, content, and/or the like with categories or tags 310.

State access instructions may be created and/or stored in a state access instruction report 314. The state access instructions may include activity objects and/or parameter variables (or parameter values) as determined in the static analysis 302 and/or the dynamic analysis 304. The state access instructions may include the tags 310 (e.g., parameter variables that correspond to parameter values such as those that may be stored in the knowledge system 104).

FIG. 4 is a portion of a state access instruction report in some embodiments. The state access instruction report may be in any language and/or in any format. The portion of the state access instruction report as shown in FIG. 4 is in XML. The application name 402 identifies an application package. In some embodiments, any number of the state access instructions of the state access instruction report may be utilized to change the application state of the application identified by the application name 402. The deepstate name 404 may identify the desired application state of the application to be reached with the state access instruction. The intent target 406 may indicate that activity object (e.g., function instructions) that may configure the application to the application state identified by deepstate name 404.

The parameters shown in FIG. 4 define and indicate parameter variables for the activity object to be called by the state access instruction. The parameters may indicate parameter values to be received from a user, from the knowledge system 104, and/or another application.

It will be appreciated that the state access instruction report may have any number of state access instructions.

Figure 5:
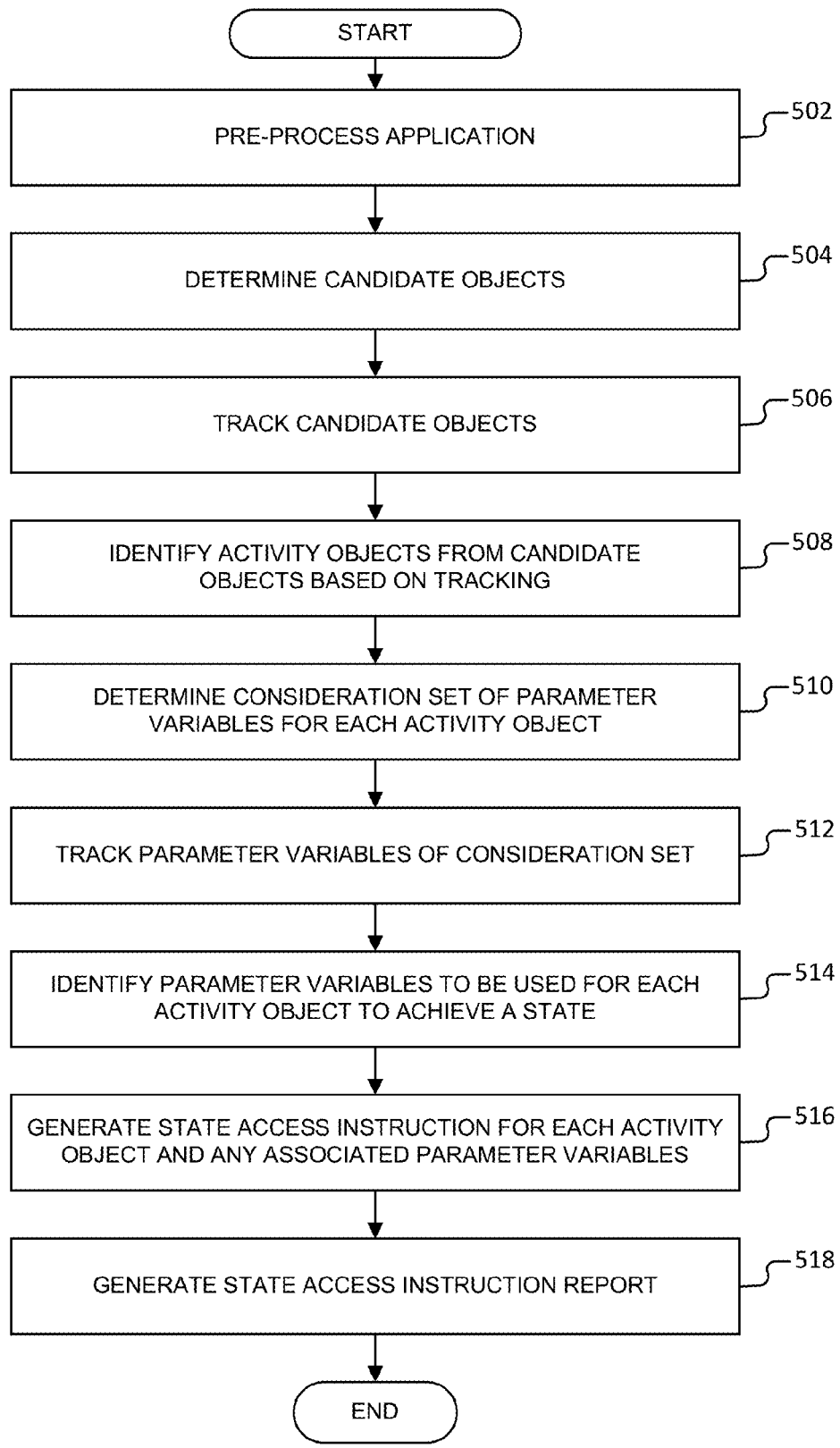
FIG. 5 is a flowchart of an example method for discovering application states of an application.

FIG. 5 is a flowchart of an example method for discovering application states of an application. In step 502, the pre-processing module 206 of the static discovery module 202 may decompile an application. The application may be any application including, for example, an application executable on a mobile device. In some embodiments, the pre-processing module 206 decompiles, decompresses, parses, and/or the like the application code to a reviewable code. The reviewable code is code that may be reviewed by a user (e.g., administrator) and/or other module or other digital device.

In various embodiments, the pre-processing module 206 decompresses an application package, extracts the desired code (e.g., a subset of the package contents) from the package, and decompiles the extracted, desired code into reviewable code. The pre-processing module 206 may parse the decompiled code.

In step 504, the object identification module 208 determines candidate objects (e.g., candidate activity objects). A candidate object is any object that may change or assist in changing the application state of the application. It will be appreciated that the reviewable code of an object may indicate or suggest functionality that changes or assists in changing the application state of the application. In some embodiments, the object identification module 208 may scan the reviewable code to identify any number of candidate objects. In some embodiments, the object identification module 208 may compare an object from the reviewable code to any number of patterns and/or object templates that may indicate the desired functionality (e.g., changing or assisting in changing an application state) to identify the candidate objects.

In step 506, the object tracking module 212 may track the candidate objects in the reviewable code. For example, the activity object selection module 210 may select a candidate object of a set of candidate objects identified by the object identification module 208. The object tracking module 212 may track or trace the candidate object's functionality and the functionality of the application that affect the candidate object through the reviewable code.

In step 508, the object tracking module 212 may identify objects based on tracking. In some embodiments, the object tracking module 212 may retrieve or receive pattern matching rules (e.g., from the data store 114). The pattern matching rules may enable the object tracking module 212 to identify activity objects based on recognized patterns of code and/or functionality identified in the decompiled code.

It will be appreciated that there may be different pattern matching rules for different applications. For example, there may be pattern matching rules for a review application and different pattern matching rules for a recommendation application. A recommendation application may be an application that recommends business or services to a user based on criteria provided by the user, such as recommending restaurants, cleaning services, or the like. The object tracking module 212 may identify the application that will be or is pre-processed. The object tracking module 212 may subsequently retrieve pattern matching rules based on the identified application.

For example, the object tracking module 212 may initiate a process where a starting point for a pattern (e.g., the first function or activity associated with the candidate object) recognized in the reviewable code and subsequently scan and/or review the reviewable code for other functionality that further matches the pattern until the pattern is matched (i.e., forward matching). In another example, the object tracking module 212 may initiate a process with an exit point (e.g., the ending of a process that changes the application state of the application) and subsequently scan and/or review the reviewable code for other functionality that further matches the pattern until the pattern is matched (i.e., backward matching).

It will be appreciated that the object tracking module 212 may recognize or otherwise identify an activity object in any number of ways.

In step 510, the parameter discovery module 214 determines a consideration set of parameter variables for each activity object. For example, the object tracking module 212 may identify an activity object based on object tracing using the reviewable code. The parameter discovery module 214 may identify all parameter variables that may be used by the activity object (e.g., including those parameter variables in the activity object definition) that may be used to change or assist in changing the application state of the application.

In various embodiments, the parameter discovery module 214 may identify parameter variables to add to the consideration set of parameter variables. The parameter discovery module 214 may include any number of variables created or used by the activity object as indicated in the reviewable code. The parameter discovery module 214 may also include any number of variables that may affect the functionality of the activity object as indicated in the reviewable code.

In step 512, the parameter discovery module 214 may track variables of the consideration set to identify parameter variables. For example, the parameter discovery module 214 may trace the function and use of each variable in the reviewable code to identify those variables (i.e., parameter variables) that may be used by or with the activity object to change the application state of the application.

In step 514, the parameter discovery module 214 identifies parameter variables to be used by or with each activity object to change the application to different application states. In one example, the parameter discovery module 214 identifies parameter variables based on the tracking of variables of the consideration set.

In step 516, the state access instruction generation module 218 may generate one or more state access instruction(s) for each activity object and any associated parameter variables. For example, the state access instruction generation module 218 may generate a state access instruction identifying the activity object and parameter variables identified by the parameter discovery module 214. In one example, the state access instruction may be template state instruction that may be used to configure or assist in the configuration of an application to a new state.

The template state instruction may include an identification (or call) of the activity object (e.g., an application resource identifier) and the parameter variable(s) (if any). The parameter variables may refer to values (e.g., parameter values) that may be stored (e.g., in the knowledge system 104, by the application, another data store, another application, or remotely). In various embodiments, the state access instruction (e.g., template state instruction) may be stored (e.g., in the knowledge system).

In step 518, the static state access instruction report module 220 may generate a report including any or all of the state access instruction(s) from the state access instruction generation module 218.

Figure 6:
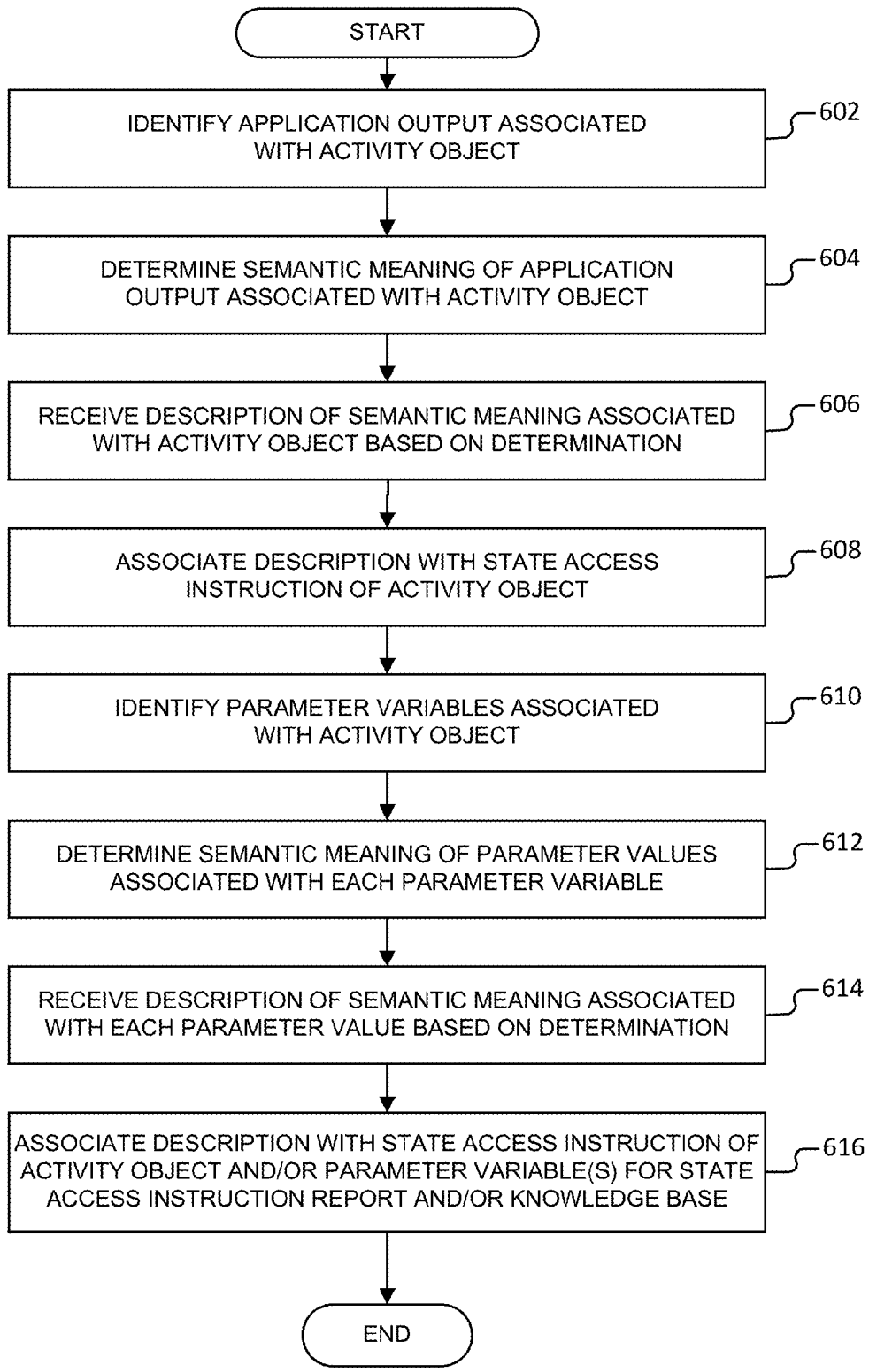
FIG. 6 is a flowchart of an example method for identifying semantic meaning associated with an activity object and associated parameter variables (if any) in some embodiments.

FIG. 6 is a flowchart of an example method for identifying semantic meaning associated with an activity object and associated parameter variables (if any) in some embodiments. In step 602, the static semantic module 216 may identify application output (e.g., an output interface or contents that may appear in an output interface as identified by the reviewable code) associated with the activity object. For example, the static semantic module 216 may review the reviewable code to identify an indication of a change of state caused by or related to an activity object. Based on review of the reviewable code, the static semantic module 216 may identify the output of the application when the application is configured to reach the desired application state.

In step 604, the static semantic module 216 determines semantic meaning of the application output associated with the activity object. In various embodiments, the static semantic module 216 may receive or retrieve semantic rules (e.g., from the data store 114). The semantic rules may provide associations between one or more portions (e.g., elements and/or functions) of reviewable code and predetermined meanings. For example, the semantic rules may associate portions of code used to generate, receive, or provide names of eating establishments with a semantic meaning (e.g., "restaurants").

It will be appreciated that the application state discovery engine 110 may include or be associated with a machine learning module configured to learn associations of portions of reviewable code and meaning. In some embodiments, a machine learning module may be configured to scan or review the reviewable code to identify semantic meaning. The machine learning module may also be trained using predetermined associations.

In step 606, the static semantic module 216 may receive a description of semantic meaning associated with the activity object based on the determination. In various embodiments, an administrator or another application may receive or identify an activity object from the reviewable code and indications of output associated with the function of the activity object. The indications of output may also be indicated by the reviewable code. In some embodiments, the administrator may provide semantic meaning to the static semantic module 216.

It will be appreciated that the semantic meaning may be determined and/or received in any number of ways. Further, semantic meaning maybe provided by any number of administrators and/or automated. If output associated with an activity object receives different indications of meaning, the static semantic module 216 may provide the different meanings to an administrator or resolve the many meanings in any number of ways.

In step 608, the static semantic module 216 associates the description with a state access instruction of the activity object. In various embodiments, the static semantic module 216 may associate the description and/or categories associated with the description with a state access instruction. For example, the state access instruction generation module 218 may generate a state access instruction that identifies an activity object and any associated parameter variables that may be used to configure an application to a particular application state. Output associated with that particular application state may be characterized with semantic meaning (e.g., descriptions). The semantic meaning may further be categorized or tagged by the static semantic module 216. The static semantic module 216 may categorize the semantic meaning using categories that categorize content within the knowledge system 104.

In step 610, the static semantic module 216 identifies parameter variables associated with the activity object. As previously discussed, the state access instruction generation module 218 may generate a state access instruction that identifies an activity object and associated parameter variables that may be used to configure an application to a particular state. The reviewable code may provide indications of the semantic meaning of any number of parameter variables.

In step 612, the static semantic module 216 determines semantic meaning of parameter variables. In some embodiments, the static semantic module 216 identifies the meaning of parameter values associated with a parameter variable. The semantic meaning of the parameter values may then be associated with the parameter variable. For example, the static semantic module 216 may identify parameter values associated with the parameter variables. If the parameter values are, for example, zip codes, the static semantic module 216 may associate the semantic meaning "zip code" with the parameter variable.

In step 614, the static semantic module 216 may receive a description of semantic meaning associated with each parameter value based on the determination. In some embodiments, the static semantic module 216 may identify and/or provide indications of use of any number of variables in the reviewable code. A user, static semantic module 216, another application, and/or machine learning module may provide semantic meaning of any or all parameter variables associated with an activity object (e.g., based on the reviewable code and/or any information provided by the static semantic module 216). The semantic meaning of parameter variables may further be categorized or tagged by the static semantic module 216. The static semantic module 216 may categorize the semantic meaning of parameter variables using categories that categorize content within the knowledge system 104.

In step 616, the static semantic module 216 associates the description of the semantic meaning of any number of parameter variables with a state access instruction of the activity object. In various embodiments, the static semantic module 216 may associate the description and/or categories associated with the description of parameter variables with a state access instruction. As previously discussed, the state access instruction generation module 218 may generate a state access instruction that identifies an activity object and any associated parameter variables that may be used to configure an application to a particular state. Parameter variables and/or parameter values may be associated with semantic meaning. The semantic meaning may further be categorized or tagged by the static semantic module 216. The static semantic module 216 may categorize the semantic meaning using categories that categorize content within the knowledge system 104.

Figure 7:
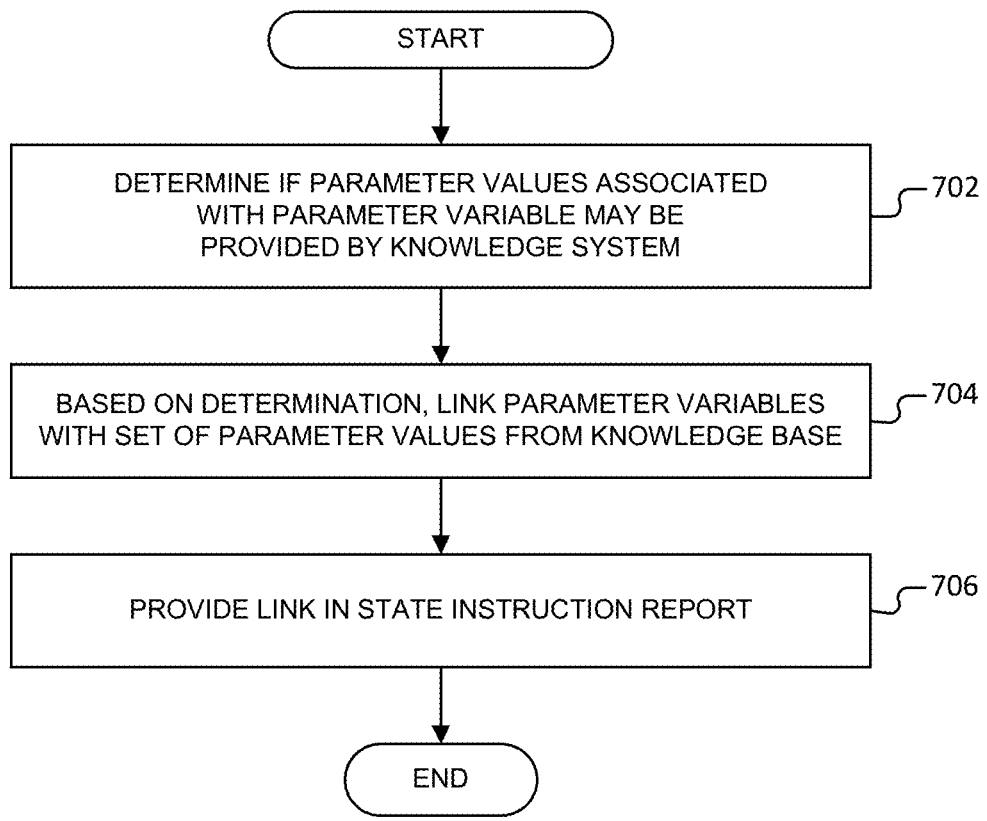
FIG. 7 is a flowchart of an example method for linking parameter values with parameter variables.

FIG. 7 is a flowchart of an example method for linking parameter values with parameter variables. In step 702, the parameter discovery module 214 may determine if one or more parameter values associated with a parameter variable may be provided by the knowledge system 104. In various embodiments, the parameter discovery module 214 may identify any number of parameter values in the reviewable code that are associated with parameter variables. The static semantic module 216 may provide or receive semantic meaning associated with the parameter variables based on the parameter values as discussed herein. Further, the static semantic module 216 may associate categories (e.g., tags) with parameter variables.

In various embodiments, the parameter discovery module 214 may, based on the categories, determine if there are previously stored parameter values that may be associated with the parameter variables. For example, if the parameter variables are variables for referring to zip codes, the parameter discovery module 214 may determine that the knowledge system 104 has a set of zip codes that may be parameter values for the parameter variable. It will be appreciated that any number of parameter values may be associated with any number of parameter variables. Similarly, parameter values from any source (e.g., data store, remote server, another local application, or the like) may be associated with parameter variables.

In step 704, the parameter discovery module 214 may link parameter variables with any number of a set of parameter values from the knowledge system 104. For example, once the parameter discovery module 214 determines a set of parameter values from the knowledge system 104 may be associated with a parameter variable in a state access instruction, the parameter discovery module 214 may modify the state access instruction or provide additional information to allow the parameter values in the knowledge system 104 to be used when changing the state of the application. It will be appreciated that any number of parameter values from different sources may be linked with any number of parameter variables.

In step 706, the parameter discovery module 214 may include the modified state access instruction in the state instruction report and/or in any memory (e.g., knowledge system 104).

Figure 8:
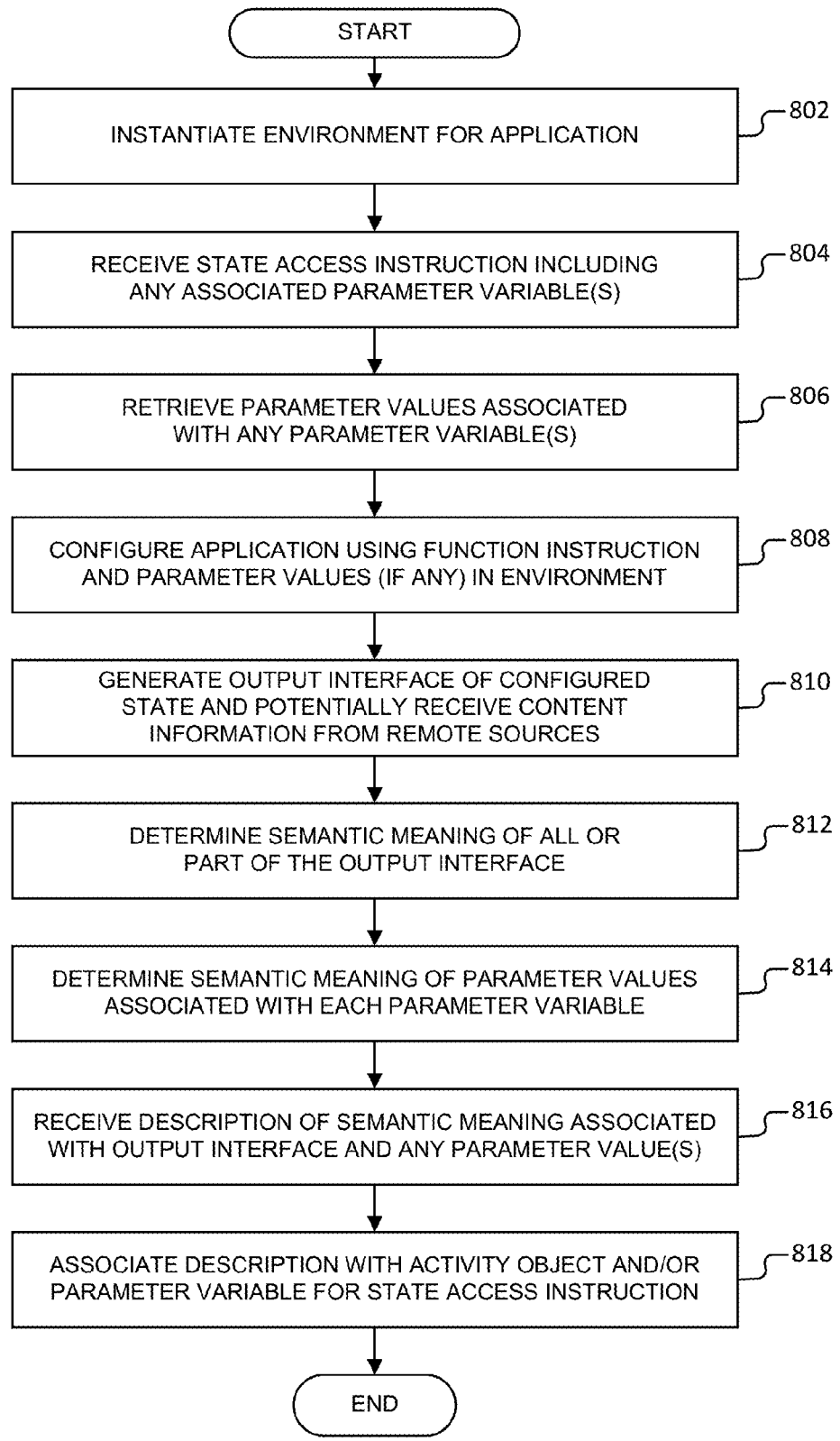
FIG. 8 is a flowchart of an example method for discovering states of an application in a dynamic environment.

FIG. 8 is a flowchart of an example method for discovering states of an application in a dynamic environment. In step 802, the environment module 224 may instantiate an environment for the application. For example, the environment module 224 may instantiate an emulated environment or a virtualization.

In step 804, the environment module 224 and/or the state configuration module 226 may receive a state access instruction including references to activity objects and any associated parameter variables. In some embodiments, the state configuration module 226 may select state access instructions from a state access instruction report. The state access instruction and/or state access instruction report may be provided to the state configuration module 226 in any number of ways.

In step 806, the state configuration module 226 may retrieve parameter values associated with any parameter variables. The state access instruction received by the state configuration module 226 may include one or more parameter values rather than parameter variables. In some embodiments, the state access instruction may include a parameter variable with a link that is associated with parameter values contained in the knowledge system 104 or any source. The state configuration module 226 may retrieve any number of parameter values based on the link.

In step 808, the state configuration module 226 configures the application in the environment using the state access instruction and any linked parameter values associated with the state access instruction to generate an output interface. For example, the state configuration module 226 may control and configure the application in the environment using the state access instruction and any linked parameter values.

Once the application is configured by the state configuration module 226, the application may generate an output interface in step 810. The output interface may correspond to the state and may include UI elements and/or content. In various embodiments, the output interface may include information generated by application or retrieved from an external source (e.g., application server 106-1 or locally). It will be appreciated that inspection of the application code (e.g., the reviewable code of the application) may not indicate or suggest the information that may be received (e.g., downloaded) from other sources. As a result, in some embodiments, the dynamic discovery module 204 may configure the application in an environment to generate/receive information from those sources to allow for semantic meaning and description of functions and parameter values.

In step 812, the dynamic semantic module 232 may determine semantic meaning of all or part of the output interface. A user, the dynamic semantic module 232, and/or machine learning module may recognize the content generated or provided by all or part of the output interface. The user, the dynamic semantic module 232, and/or machine learning module may determine and/or characterize the content, layout, functionality, and/or the like of an output interface generated by the application.

In step 814, the dynamic semantic module 232 may determine semantic meaning of parameter values associated with each parameter variable used to configure an application to an application state. For example, the user, the dynamic semantic module 232, and/or machine learning module may recognize semantic meaning from a UI element requesting information to be used as a parameter variable (e.g., a field request for information). In another example, the user, the dynamic semantic module 232, and/or machine learning module may recognize semantic meaning of parameter variables from the output interface (e.g., requesting an area code), semantic meaning of activity objects (e.g., based on the output of the state associated with an activity object), and output of the state.

In step 816, the dynamic semantic module 232 may receive description (e.g., text, categories, tags, or the like) that describe the semantic meaning associated with output interface and any parameter value(s) and/or parameter variables. The description may be provided by any source including, but not limited to, the user, the dynamic semantic module 232, and/or machine learning module.

In step 818, the dynamic semantic module 232 may associate the description with the activity object and/or parameter variables of the state access instructions and/or state access instruction report. In various embodiments, the dynamic semantic module 232 may provide the description and the associated state access instruction to the knowledge system 104. In some embodiments, a user may provide a query. The knowledge system 104 or a search system may identify the state access instruction using the information from the query and the description. The description may be used in any number of ways.

In some embodiments, the state access instruction may include a subset of parameter values (e.g., discovered from static analysis of the reviewable code). The dynamic discovery module 204 may configure an application in an emulation environment using the state access instruction and any number of the values from the subset to generate an output interface. The dynamic semantic module 232, based on the output interface and/or any of the subset of parameter values, may allow for the determination of semantic meaning of the parameter variable(s).

In some embodiments, semantic meaning determined by the static discovery module 202 may be improved. For example, the static discovery module 202 may identify a preliminary semantic meaning of an activity object and/or parameter variables based on inspection of the reviewable code. The dynamic discovery module 204, by configuring an application to a particular state and generating the output interface related to that state, may provide an improved understanding of the activity object and/or parameter variables (e.g., from an administrator and/or the dynamic semantic module) thereby allowing for improved or additional semantic meaning. As a result, additional categorization and/or descriptions may be applied or associated with the related state access instruction.

Figure 9:
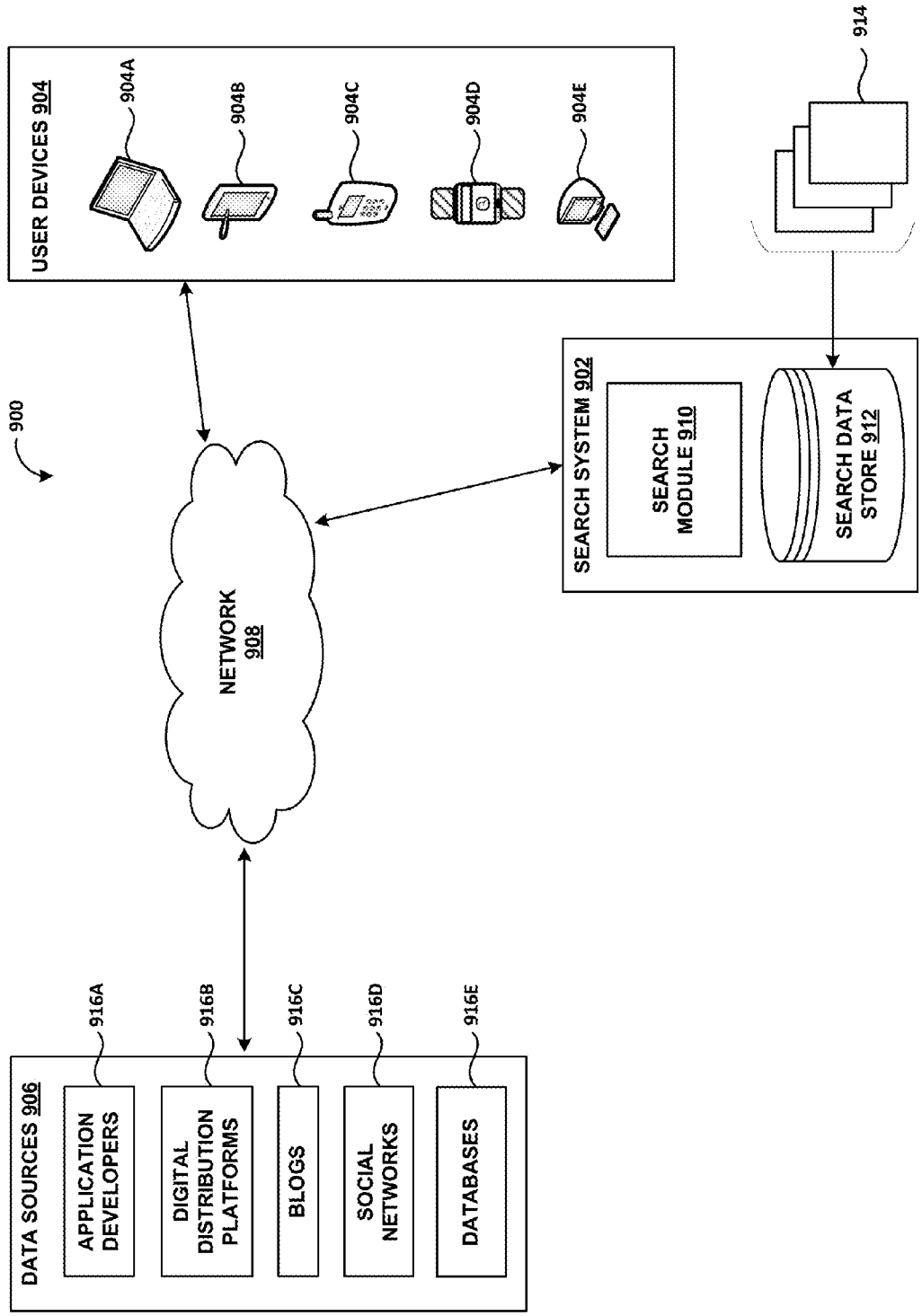
FIG. 9 is illustrates an environment including a search system, user devices, and data sources in communication over a network in some embodiments.

FIG. 9 is illustrates an environment 900 including a search system 902, user devices 904, and data sources 906 in communication over a network 908 in some embodiments. The network 908 may be any type of network, including but not limited to a local area network ("LAN"), such as an intranet, a wide area network ("WAN"), such as the Internet, or any combination thereof. Further, the network 908 may be a public network, a private network, or a combination thereof. The network 908 may also be implemented using any number of communications links associated with one or more service providers, including one or more wired communication links, one or more wireless communication links, or any combination thereof. Additionally, the network 908 may be configured to support the transmission of data formatted using any number of protocols.

Multiple computing devices may be connected to network 908. A computing device may be any type of general computing device (e.g., a device with a processor and memory) capable of network communication with other computing devices. For example, a computing device may be a personal computing device such as a desktop or workstation, a business server, or a portable computing device, such as a laptop, smart phone, or a tablet PC. A computing device may include some or all of the features, components, and peripherals of the digital device 1400 of FIG. 14. To facilitate communication with other computing devices, a computing device may also include a communication interface configured to receive a communication, such as a request, data, or the like, from another computing device in network communication and pass the communication along to an appropriate module running on the computing device. The communication interface may also be configured to send a communication to another computing device in network communication with the computing device.

In some embodiments, the search system 902 receives a search query from a user device 904, finds applications (e.g., using information from the search query), and generates search results (e.g., including links to download applications identified in the search results).

User devices 904 can be any computing devices that are capable of providing queries to the search system 902. User devices 904 include, but are not limited to, mobile computing devices, such as laptops 904a, tablets 904b, smart phones 904c, and wearable computing devices 904d (e.g., headsets and/or watches). User devices 904 may also include other computing devices having other form factors, such as computing devices included in desktop computers 904e, vehicles, gaming devices, televisions, or other appliances (e.g., networked home automation devices and home appliances).

The user devices 904 may use a variety of different operating systems. In examples where a user device 904 is a mobile device, the user device 904 may run an operating system including, but not limited to, ANDROID® developed by Google Inc., iOS® developed by Apple Inc., or WINDOWS PHONE® developed by Microsoft Corporation. Accordingly, the operating system running on the user device 904 may include, but is not limited to, one of ANDROID®, iOS®, or WINDOWS PHONE®. In an example where a user device is a laptop or desktop computing device, the user device may run an operating system including, but not limited to, MICROSOFT WINDOWS® by Microsoft Corporation, MAC OS® by Apple, Inc., or Linux. User devices 904 may also access the search system 902 while running operating systems other than those operating systems described above, whether presently available or developed in the future.

Data sources 906 may be sources of data which the search system 902 (e.g., the search module 910) may use to generate and update the data store 912. The data retrieved from the data sources 906 can include any type of data related to application functionality and/or application states. Data retrieved from the data sources 906 may be used to create and/or update one or more databases, indices, tables (e.g., an access table), files, or other data structures included in the data store 912. For example, application state records 914 (discussed further herein) may be created and updated based on data retrieved from the data sources 906. In some examples, some data included in a data source 906 may be manually generated by a human operator. Data included in the application state records 914 may be updated over time so that the search system 902 provides up-to-date results.

The data sources 906 may include a variety of different data providers. The data sources 906 may include data from application developers 916a, such as application developers' websites and data feeds provided by developers. The data sources 906 may include operators of digital distribution platforms 916b configured to distribute native applications 1026*a* to user devices 904. Example digital distribution platforms 916*b* include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 906 may also include other websites, such as websites that include web logs 916*c* (i.e., blogs), application review websites or other websites including data related to applications. Additionally, the data sources 906 may include social networking sites 916*d*, such as "FACEBOOK®" by Facebook, Inc. (e.g., Facebook posts) and "TWITTER®" by Twitter Inc. (e.g., text from tweets). Data sources 906 may also include online databases 916*e* that include, but are not limited to, data related to movies, television programs, music, and restaurants. Data sources 906 may also include additional types of data sources in addition to the data sources described above. Different data sources 906 may have their own content and update rate.

The search system 902 includes a search module 910 in communication with a search data store 912. The search data store 912 may include one or more databases, indices (e.g., inverted indices), tables, files, or other data structures that may be used to implement the techniques of the present disclosure. The search module 910 receives a query wrapper and generates search results based on the data included in the data store 912. In some implementations, the search module 910 receives a query wrapper from the user device 904 and performs a search for application state records 914 included in the search data store 912 based on data included in the query wrapper, such as a search query. The application state records 914 include one or more access mechanisms that the user device 904 may use to access different functions for a variety of different applications, such as native applications installed on the user device 904*a*. The search module 910 may transmit search results including a list of access mechanisms to the user device 904 that generated the query wrapper.

Figure 10:
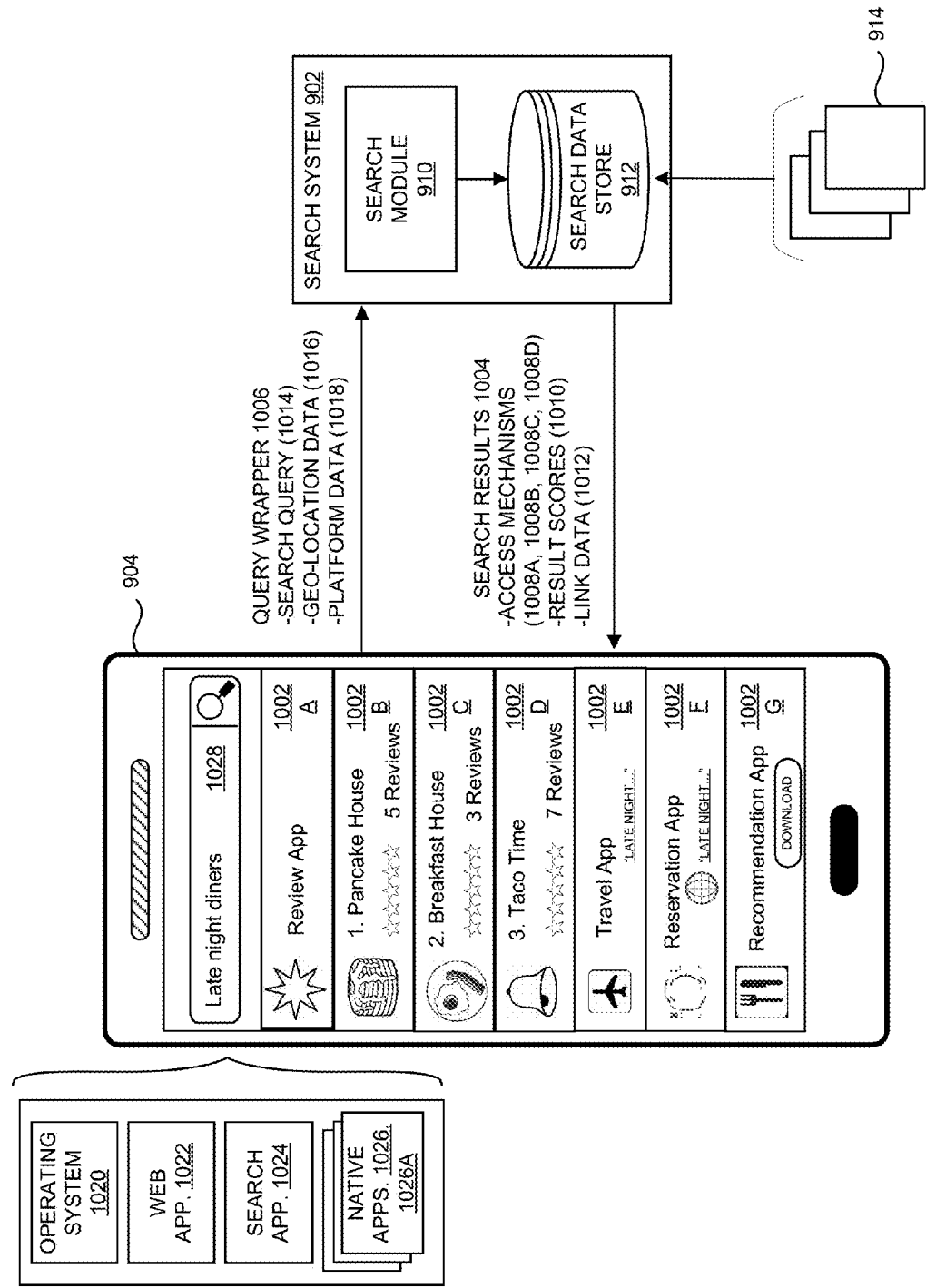
FIG. 10 shows example interaction between the user device and search system in some embodiments.

FIG. 10 shows example interaction between the user device 904 and search system 902 in some embodiments. In various embodiments, the user device 904 generates user selectable links 1002*a*-1002*g* based on the received search results 1004. Each user selectable link 1002*a*-1002*g* displayed to the user may include an access mechanism 1008*a*-1008*d*. The user may select any of user selectable links 1002*a*-1002*g* on the user device 904 by interacting with the link (e.g., touching or clicking the link). In response to selection of a link, the user device 904 may launch a corresponding software application 1026 (e.g., a native application 1026*a*) referenced by the access mechanism 1008*a*-*d* and perform one or more operations indicated in the access mechanism.

Access mechanisms may each include at least one of a native application access mechanism 1008*a* (hereinafter "application access mechanism"), a web access mechanism 1008*b*, and an application download mechanism 1008*c*. The user device 904 may use the access mechanisms 1008*a*-*d* to access functionality of applications 1026. For example, the user may select a user selectable link 1002*a* including an access mechanism 1008*a* in order to access functionality of an application 1026*a* indicated in the user selectable link 1002*a*. The search module 910 may transmit one or more application access mechanisms 1008*a*, one or more web access mechanisms 1008, and one or more application download mechanisms 1008*c* to the user device 904 in the search results 1004.

An application access mechanism 1008*a* may be a string that includes a reference to a native application 1026*a* and indicates one or more operations for the user device 904 to perform. If a user selects a user selectable link 1002*a* including an application access mechanism 1008*a*, the user device 904 may launch the native application 1026*a* referenced in the application access mechanism 1008*a* and perform the one or more operations indicated in the application access mechanism 1008*a*. The application access mechanism 1008*a* may be, in some embodiments, a state access instruction discovered by the application state discovery engine 110.

A web access mechanism 1008*b* may include a resource identifier that includes a reference to a web resource (e.g., a page of a web application/website). For example, a web access mechanism 1008*b* may include a uniform resource locator (URL) (e.g., a web address) used with hypertext transfer protocol (HTTP). If a user selects a user selectable link 1002*f* including a web access mechanism 1008*b*, the user device 904 may launch the web browser application 1022 and retrieve the web resource indicated in the resource identifier. Put another way, if a user selects a user selectable link 1002*f* (e.g., "late night . . . ") including a web access mechanism 1008*b*, the user device 904 may launch a corresponding web browser application 1022 and access a state (e.g., a page) of a web application/website. In some examples, web access mechanisms 1008*b* include URLs for mobile-optimized sites and/or full sites.

An application download mechanism 1008*c* may indicate a location (e.g., a digital distribution platform 906) where a native application 1026*a* can be downloaded in the scenario where the native application 1026*a* is not installed on the user device 904. If a user selects a user selectable link 1002*g* including an application download mechanism 1008*c*, the user device 904 may access a digital distribution platform from which the referenced native application 1026*a* may be downloaded. The user device 904 may access a digital distribution platform 926*b* using at least one of the web browser application 1022 and one of the native applications 1026*a*.

The application state access mechanism 1008*d* may include an application resource identifier and/or one or more operations for a user device 904 to perform. For example, an application resource identifier may be a string having an application specific scheme. The application resource identifier may include a reference to a native application and indicate one or more operations for the user device 904 (e.g., the native application) to perform. For example, the application resource identifier may include a reference to a native application, a domain name, and a path to be used by the native application to retrieve and display information to the user.

An example application resource identifier for the reservation native application on the android operating system is "vnd.reservationapplication.deeplink://reservationapplication.com/restaura nt/profile?rid=88333&refid=1." A portion of the example application resource identifier references the reservation native application. For example, the substring "vnd.reservationapplication.deeplink" of the application resource identifier references the reservation native application. The example application resource identifier also indicates one or more operations for the reservation native application to perform. For example, the reservation native application may retrieve and display the information included in the application resource identifier domain and path defined by the substring "reservationapplication.com/restaurant/profile?rid=88333&refid=1." In response to receiving the application resource identifier, the user device 904 may launch the reservation native application and display information retrieved from the location indicated in the application resource identifier. The application resource identifier may be provided by the app developer in some examples.

The application state access mechanism 1008*d* may be, in some embodiments, a state access instruction discovered by the application state discovery engine 110.

In some examples, the application state access mechanism 1008*d* may include operations for the user device 904 to perform in addition to the operation(s) indicated in the application resource identifier. For example, the search application 1024 on the user device 904, the operating system 1020 of the user device 904, and/or a native application 1026*a* installed on the user device 904 may perform the operations included in the application access mechanism 1008*d* in order to set the native application 1026*a* into an application state specified by the application state access mechanism 1008*d*. In some examples, the operations may be included in a script. Examples of operations may include, but are not limited to, launching a native application, waiting for the native application to start, creating and sending a search request to a server, setting a current geo-location in a native application, making a restaurant reservation, sending a text message, and adding an appointment to a calendar.

In some examples, the application state access mechanism 1008*d* may not include an application resource identifier. Instead, the application state access mechanism 1008*d* may include other operations that reference a native application 1026*a*. The operations may be performed by the user device 904. The one or more operations may include instructions for at least one of the search application 1024, the operating system 1020, and a native application 1026*a* on the user device 904. In response to selection of the application state access mechanism 1008*d*, the user device 904 may perform the operations included in the application state access mechanism 1008*d*. In some examples, the operations may be included in a script.

The application state access mechanism 1008*d* may also include edition information that indicates the application edition with which the application state access mechanism 1008*d* is compatible. For example, the edition information may indicate the operating system with which the application state access mechanism 1008*d* is compatible. In some examples, the search system 902 may determine whether to transmit the application state access mechanism 1008*d* in the search results 1004 based on whether the user device 904 (e.g., operating system 1020) can handle and/or understand the application state access mechanism 1008*d*.

In some examples, an application resource identifier is an application specific resource identifier that is defined by the developer of the application. In this example, the search application 1024 receives the application resource identifier and the operating system 1020 may send the application resource identifier to the native application 1026*a* referenced in the application resource identifier. The native application 1026*a* referenced in the application resource identifier launches and is set into the state specified by the application resource identifier.

In some examples, an application function may not be accessible using an application state identifier. For example, a function of the application may not include a corresponding application resource identifier that the application may use to perform the function. As another example, some applications may not be configured to receive an application resource identifier. In these examples, an application access mechanism 1008*d* for the native application 1026*a* can include one or more operations that cause the native application 1026*a* to perform the function that may not otherwise be accessible using an application resource identifier. For example, the search application 1024 may receive the one or more operations and execute the one or more operations to set the native application 1026*a* into the desired application state. In a specific example, the one or more operations may include launching the native application 1026*a* along with additional operations for the native application 1026*a* to perform. For example, the search application 902 may initially trigger the native application 1026*a* to start and then wait for a period of time for the native application to start. Then the search application 1024 may perform additional operations included in the received application access mechanism 1008*a*, such as issuing a search instruction to the native application 1026*a*.

In still other examples, a native application 1026*a* may be configured to directly receive the operations transmitted by the search system 902. In these examples, the native application may be launched according to the application access mechanism and then the launched native application may directly perform the operations received from the search system 902.

A single native application can provide a variety of different functionalities. For example, a restaurant reservation application can access reviews for a variety of different restaurants and set up reservations at a variety of different restaurants. Similarly, a travel application can book hotels, book flights, and provide reviews for different travel destinations. The different functionalities associated with a single native application may be accessed using a plurality of different application access mechanisms. For example, with respect to the restaurant reservation application, the search data store 912 may include application state records having different application access mechanisms for accessing different restaurant reviews and setting up reservations. Similarly, the search data store 912 may include application state records having different application access mechanisms for booking hotels, booking flights, and accessing reviews for different travel destinations.

The application access mechanisms 1008*d* for a single native application may vary in complexity. In some examples, the application access mechanisms may cause a native application to launch and then perform additional operations after launching, as described above. In other examples, application access mechanisms may cause an application to launch into a default state (e.g., a default homepage) without performing any additional operations. An application state record including application access mechanisms that causes an application to launch into a default state may be thought of as an access mechanism that is related to the native application, but not any particular state which may be accessed by the application. An application state record including such an application access mechanism may include application state information describing the native application, instead of any particular application state. For example, the application state information may include the name of the developer of the application, the publisher of the application, a category (e.g., genre) of the application, a description of the application (e.g., a developer's description), and the price of the application. The application state information may also include security or privacy data about the application, battery usage of the application, and bandwidth usage of the application. The application state information may also include application statistics. Application statistics may refer to numerical data related to a native application. For example, application statistics may include, but are not limited to, a number of downloads, a download rate (e.g., downloads per month), a number of ratings, and a number of reviews.

The search module 910 is configured to receive a query wrapper 1006 from the user device 904 via the network 908 (see FIG. 9). A query wrapper 1006 may include a search query 1014, which may include text, numbers, and/or symbols (e.g., punctuation) entered into the user device 904 by the user. For example, the user may enter the search query 1014 into a search field 1028 (e.g., a search box) of a graphical user interface (GUI) of a search application 1024 running on the user device 904. A user may enter a search query 1014 using a touchscreen keypad, a mechanical keypad, a speech-to-text program, or other form of user input. In general, a search query 1014 may be a request for information retrieval (e.g., search results) from the search system 902. For example, a search query 1014 may be directed to retrieving a list of links 1002a-g to application functionality or application states in examples where the search system 902 is configured to generate a list of access mechanisms 1008a-d as search results 1004. A search query 1014 directed to retrieving a list of links 1002a-g to application functionality may indicate a user's desire to access functionality of one or more applications described by the search query.

In some examples, the search application 1024 may be a native application 1026a installed on the user device 904. For example, the search application 1024 may receive search queries 1014, generate the query wrapper 1006, and display received data that is included in the search results 1004. In additional examples, the user device 904 may execute a web browser application 1022 that accesses a web-based search application. In this example, the user may interact with the web-based search application via a web browser application 1022 installed on the user device 904. In still more examples, the functionality attributed to the search application 1024 may be included as a searching component of a larger application 1026 that has additional functionality. For example, the functionality attributed to the search application 1024 may be included as part of a native/web application 1026a, 1022 as a feature that provides search for the native/web application 1026a, 1022.

The query wrapper 1006 may include additional data along with the search query 1014. For example, the query wrapper 1006 may include geo-location data 1016 that indicates the location of the user device 904, such as latitude and longitude coordinates. The user device 904 may include a global positioning system (GPS) receiver that generates the geo-location data 1016 transmitted in the query wrapper 1006. The query wrapper 1006 may also include an IP address, which the search module 910 may use to determine the location of the user device 904. In some examples, the query wrapper 1006 may also include additional data, including, but not limited to, platform data 1018 (e.g., version of the operating system 1020, device type, and web-browser version), an identity of a user of the user device 904 (e.g., a username), partner specific data, and other data.

The search module 910 can use the search query 1014 and the additional data included in the query wrapper 1006 to generate the search results 1004. For example, the search module 910 can determine a geo-location of the user device 904, which the search module 910 can use along with the search query 1014 to generate the search results 1004. The search module 910 can determine the geo-location of the user device 904 based on the geo-location data or other data (e.g., IP address) included in the query wrapper 1006. In some implementations, the search module 910 detects a location (e.g., a postal address, street name, city name, etc.) specified in the search query 1014 (i.e., a query-specified location). In these implementations, the search module 910 can use the query-specified location along with the search query 1014 to generate the search results 1004.

The search module 910 performs a search for application state records 914 included in the search data store 912 in response to the received query wrapper 1006 (e.g., in response to the search query 1014 and the geo-location data 1016). In some implementations, the search module 910 generates result scores 1010 for application state records 914 identified during the search. The result score 1010 associated with an application state record 914 may indicate the relevance of the application state record 914 to the search query 1014. A higher result score 1010 may indicate that the application state record 914 is more relevant to the search query 1014. The search module 910 may retrieve access mechanisms 1008 from the scored application state records 914. The search module 910 can transmit a result score 1010 along with an access mechanism 1008 retrieved from a scored application state record 914 in order to indicate the rank of the access mechanism 1008 among other transmitted access mechanisms 1008.

In various embodiments, the search module 910 may search for an application state access mechanism 1008d using information from the search query 1014. The search module 910 may utilize information for the search query 1014 and identify semantic information stored by the application state discovery engine 110 to identify any number of application state mechanisms 1008d. The semantic information may be stored within or referenced by application state records 914. In various embodiments, the search module 910 generates results scores for application state records 914 based, in part, on the semantic meaning provided by the application state discovery engine 110.

The search module 910 may transmit additional data to the user device 904 along with the access mechanisms 1008 and the result score(s) 1010. For example, the search module 910 may transmit data (e.g., text and/or images) to be included in the user selectable links 1002. Data for the user selectable links 1002 (e.g., text and/or images) may be referred to herein as "link data." The user device 904 displays the user selectable links 1002 to the user based on received link data 1002. Each user selectable link 1002 may be associated with an access mechanism 1008 included in the search results 1004, such that when a user selects a link 1002, the user device 904 launches the application 1026 referenced in the access mechanism 1008 and sets the application 1026 into the state specified by the access mechanism 1008.

The user device 904 may receive a set of search results 1004 from the search module 910 in response to transmission of the query wrapper 1006 to the search system 902. The GUI of the search application 1024 displays (e.g., renders) the search results 1004 received from the search module 910. The search application 1024 may display the search results 1004 to the user in a variety of different ways, depending on what information is transmitted to the user device 904. In examples where the search results 1004 include a list of access mechanisms 1008 and link data, the search application 1024 may display the search results 1004 to the user as a list of user selectable links 1002 including text and images. The text and images in the links 1002 may include application names associated with the access mechanisms 1008, text describing the access mechanisms 1008, images associated with the application 1026 referenced by the access mechanisms 1008 (e.g., application icons), and images associated with the application state (e.g., application screen images) defined by the access mechanisms 1008.

In some implementations, the search application 1024 displays the search results 1004 as a list of links 1002 arranged under the search field 1028 in which the user entered the search query 1014. Moreover, the search application 1024 may arrange the links 1002 in order based on result scores 1010 associated with the access mechanisms 1008 included in the links 1002. In some examples, the search application 1024 groups the links 1002 together if the links 1002 are related to the same application 1026.

Each of the links 1002 includes link data. For example, each of the links 1002 includes an image (e.g., an icon) and text (e.g., an application or business name) that may describe an application and a state of an application. Each of the links 1002 may include an access mechanism so that if a user selects one of links 1002, the user device 904 launches the application and sets the application into a state that is specified by the access mechanism associated with the selected link. In some implementations, the user device 904 may arrange the links 1002 based on result scores associated with the access mechanisms included in the links 1002. In some implementations, as illustrated in FIG. 10, links 1002 for the same application 1026 may be combined together in the search results 1004 displayed to the user.

With respect to FIG. 10, it may be assumed that the review native application and a travel native application are installed on the user device 904. A travel application may be an application that provides reviews and recommendations regarding travel, such as hotel, car rental, airline, restaurant, or the like. Links 1002*a-d* reference the review native application and link 1002*e* references the travel native application. The GUI includes a header including the name "Review App," under which the links 1002*b-d* are arranged. The header may indicate that the links 1002*b-d* arranged below the header are associated with the review native application 1026*a*. Selection of link 1002*b* may cause the user device 904 to launch the review native application 1026*a* and retrieve a Pancake House restaurant entry of the review native application 1026*a*. Selection of link 1002*c* may cause the user device 904 to launch the review native application 1026*a* and retrieve a Breakfast House restaurant entry of the review native application 1026*a*. Selection of link 1002*e* may cause the user device 904 to launch the travel native application 1026*a* and retrieve an entry for "Late night diners" in the travel native application 1026*a* (e.g., a search for "Late night diners").

Link 1002*f* includes a web access mechanism 1008*b* (e.g., a URL). Selection of link 1002*f* may cause the user device 904 to launch the web browser application 1026*b* and retrieve an entry for "Late night diners" in the reservation web application 1026*b* developed by. Link 1002*g* includes an application download mechanism 1008*c* for the recommendation native application 1026*a*. Selection of link 1002*g* may cause the user device 904 to access a digital distribution platform 906 from which the recommendation native application 1026*a* can be downloaded and/or previewed. The search module 910 can be configured to transmit any combination of application access mechanisms 1008*a*, web access mechanisms 1008*b*, and application download mechanisms 1008*c* in the search results 1004.

In some examples, user devices 904 communicate with the search system 902 via a partner computing system (not illustrated). The partner computing system may be a computing system of a third party that may leverage the search functionality of the search system 902. The partner computing system may belong to a company or organization other than that which operates the search system 902. Example third parties which may leverage the functionality of the search system 902 may include, but are not limited to, internet search providers and wireless communications service providers. The user devices 904 may send search queries to the search system 902 and receive search results via the partner computing system. The partner computing system may provide a user interface to the user devices 904 in some examples and/or modify the search experience provided on the user devices 904.

Figure 11B:
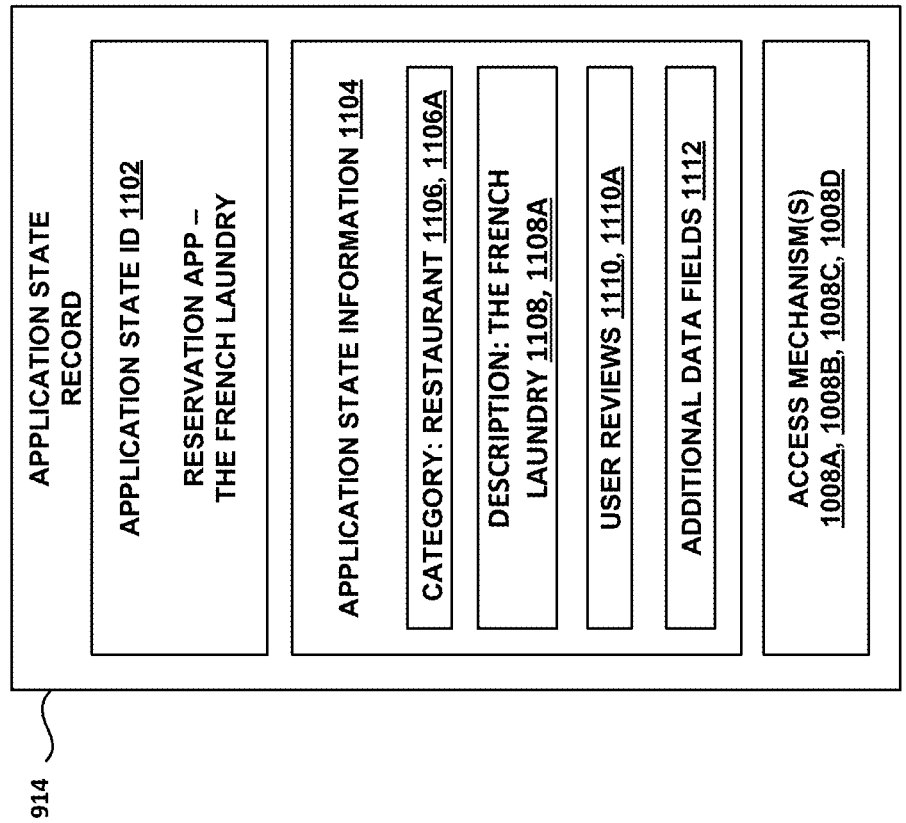
FIGS. 11A and 11B show example application state records in some embodiments.
Figure 11A:
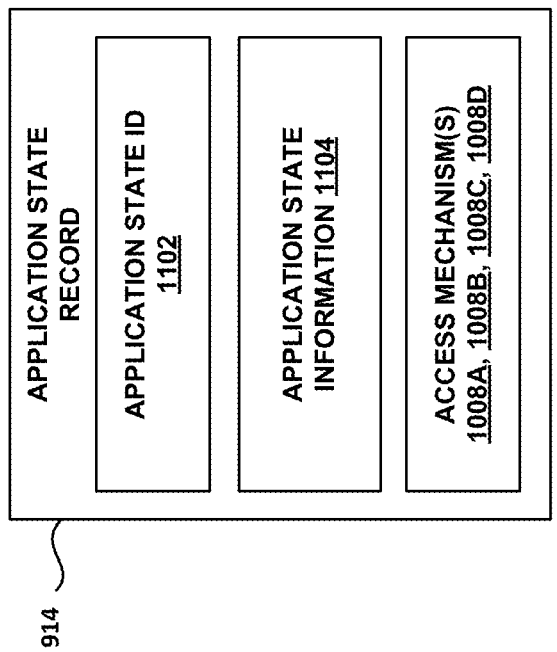

Referring to FIGS. 11A and 11B, the search data store 912 includes a plurality of different example application state records 914. Each application state record 914 may include data related to a state of the application 1026. An application state record 914 may include an application state identifier (ID) 1102, application state information 1104, and one or more access mechanisms 1008*a-d* used to access functionality provided by an application 1026.

The application state ID 1102 may be used to identify the application state record 914 among the other application state records 914 included in the search data store 912. The application state ID 1102 may be a string of alphabetic, numeric, and/or symbolic characters (e.g., punctuation marks) that uniquely identifies the associated application state record 914. In some examples, the application state ID 1102 describes a function and/or an application state in human readable form. For example, the application state ID 1102 may include the name of the application 1026 referenced in the access mechanism(s) 1008. Additionally or alternatively, the application state ID 1102 may be a human readable string that describes a function performed according to the access mechanism(s) 1008 and/or an application state resulting from performance of the function according to the access mechanism(s) 1008. In some examples, the application state ID 1102 includes a string in the format of a uniform resource locator (URL) of a web access mechanism 1008*b* for the application state record 914, which may uniquely identify the application state record 914.

In a more specific example, if the application state record 914 is for a state of the review native application, the function ID 1102 may include the name "Review Application" along with a description of the application state described in the application state information 1106. For example, the application state ID 1102 for an application state record 914 that describes the restaurant named "The French Laundry" may be "Review Application—The French Laundry." In an example where the application state ID 1102 includes a string in the format of a URL, the function ID 1102 may include the following string "http://www.reviewapplication.com/biz/the-french-laundry-yountville-2?ob=1" to uniquely identify the application state record 914. In additional examples, the function ID 1102 may include a URL using a namespace other than "http://," such as "func://."

The application state information 1104 may include data that describes an application state into which an application 1026 is set according to the access mechanism(s) 1008 in the application state record 914. Additionally or alternatively, the application state information 1104 may include data that describes the function performed according to the access mechanism(s) 1008 included in the application state record 914. The application state information 1104 may include a variety of different types of data, such as structured, semi-structured, and/or unstructured data. The application state information 1104 may be automatically and/or manually generated based on documents retrieved from the data sources 906. Moreover, the application state information 1104 may be updated so that up-to-date search results 1004 can be provided in response to a search query 1014.

In some examples, the application state information 1104 includes data that may be presented to the user by an application 1026 when the application 1026 is set in the application state defined by the access mechanism(s) 1008. For example, if one of the access mechanism(s) 1008 is an application access mechanism 1008*d*, the application state information 1104 may include data that describes a state of the native application 1026*a* after the user device 904 has performed the one or more operations indicated in the application access mechanism 1008*d*. For example, if the application state record 914 is associated with a shopping application, the application state information 1104 may include data that describes products (e.g., names and prices) that are shown when the shopping application is set to the application state defined by the access mechanism(s) 1008. As another example, if the application state record 914 is associated with a music player application, the application state information 1104 may include data that describes a song (e.g., name and artist) that is played when the music player application is set to the application state defined by the access mechanism(s) 1008.

The types of data included in the application state information 1104 may depend on the type of information associated with the application state and the functionality defined by the access mechanism(s) 1008. For example, if the application state record 914 is for an application 1026 that provides reviews of restaurants, the application state information 1104 may include information (e.g., text and numbers) related to a restaurant, such as a category of the restaurant, reviews of the restaurant, and a menu for the restaurant. In this example, the access mechanism(s) 1008 may cause the application 1026 (e.g., a native application 1026*a* or a web application 1022) to launch and retrieve information for the restaurant. As another example, if the application state record 914 is for an application 1026 that plays music, the application state information 1104 may include information related to a song, such as the name of the song, the artist, lyrics, and listener reviews. In this example, the access mechanism(s) 1008 may cause the application 1026 to launch and play the song described in the application state information 1104.

FIG. 11B shows an example application state record 914 associated with the reservation application. The reservation application may allow users to search for restaurants and make restaurant reservations. The reservation application provides information about restaurants including descriptions of restaurants and user reviews of the restaurants. The example application state record 914 of FIG. 11B describes an application state of the reservation application in which the reservation application accesses information for THE FRENCH LAUNDRY® restaurant.

The example application state record 914 includes an application state ID 1102 of "Reservation App—THE FRENCH LAUNDRY," which may be used as a unique identifier to identify the application state record 914. In other examples, the function ID 1102 could include a URL as a unique identifier for the application state record 914. For example, the application state ID 1102 may include the string "http://www.reservationapplication.com/the-french-laundry" as a unique identifier for the application state record 914. As described herein, such an application state ID may be included in a web access mechanism 1008*b* of an application state record 914. As another example, the function ID 1102 may have a different namespace than "http://," such as "func://." In yet another example, the function ID 1102 could be a string of characters, numbers, and/or symbols that are not in human readable form. Each example is optional and may be combined with other examples.

The example application state information 1104 includes data fields such as a category 1106*a* of THE FRENCH LAUNDRY® restaurant, a description 1108*a* of THE FRENCH LAUNDRY® restaurant, user reviews 1110*a* of THE FRENCH LAUNDRY® restaurant, and additional data fields 1114. The restaurant category 1106 field may include the text "French cuisine" and "contemporary," for example. The description field 1108 may include text that describes THE FRENCH LAUNDRY® restaurant. The user reviews field 1110 may include text of user reviews for THE FRENCH LAUNDRY® restaurant. The additional data fields 1112 may include additional data for THE FRENCH LAUNDRY® restaurant that may not specifically fit within the other defined fields, such as a menu for the restaurant, prices, and operating hours for the restaurant.

The application state record 914 includes one or more access mechanism(s) 1008. The access mechanism(s) 1008 may include a reference to the reservation application 1026. An example application access mechanism 1008*a* for the application state record 914 may include a reference to the reservation native application 1026*a* along with one or more operations to be performed by the user device 904. For example, the application access mechanism 1008*a* may include an application resource identifier and/or one or more operations that cause the user device 904 to access the entry for THE FRENCH LAUNDRY® restaurant in the reservation native application. An example application resource identifier may be "vnd.reservationapplication.deeplink://reservationapplication.com/restaurant/profile ?rid=1180&refid=1."

Figure 12:
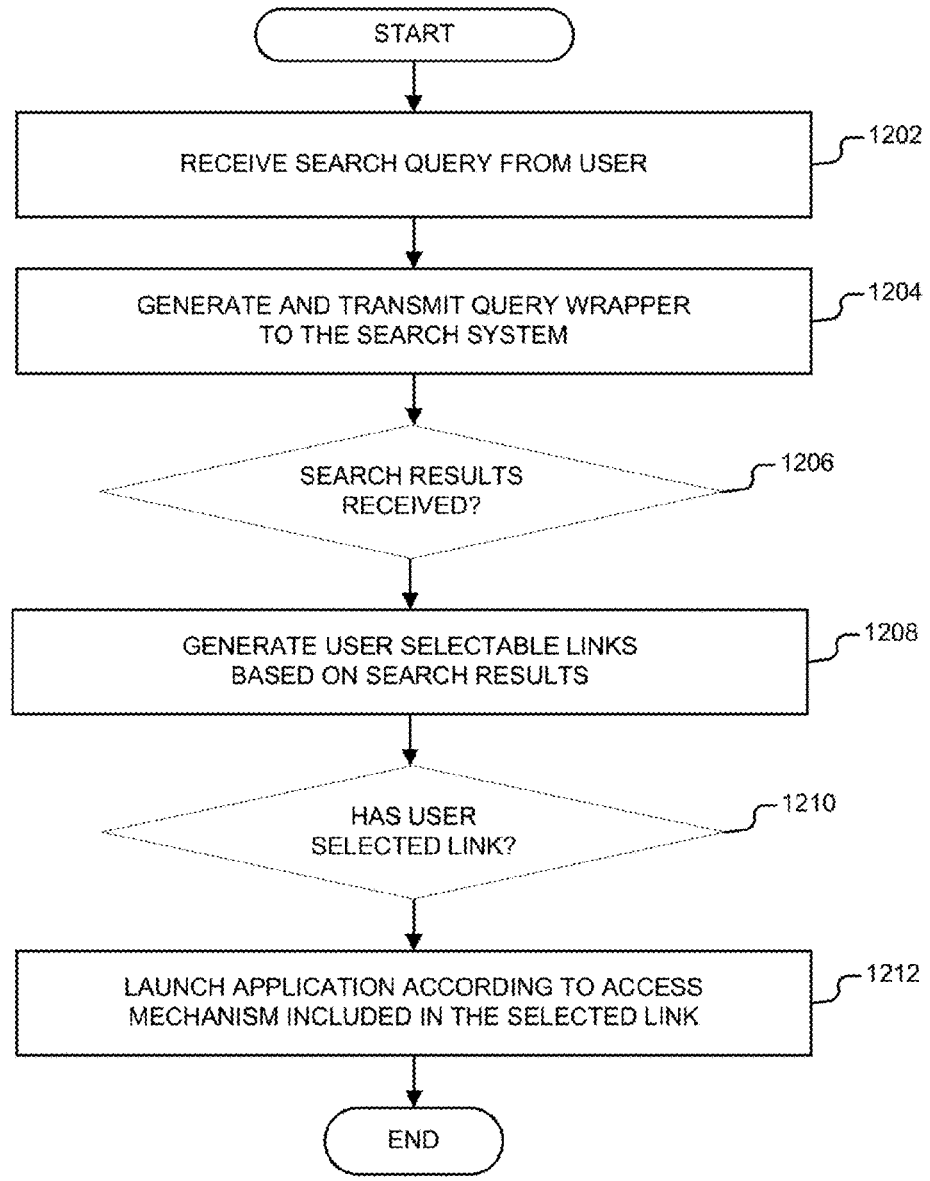
FIG. 12 provides an example arrangement of operations for a method of operating a user device.

FIG. 12 provides an example arrangement of operations for a method 1200 of operating a user device 904. It may be assumed that the user device 904 described according to the method 1200 includes a search application 1024 (e.g., a native application 1026*a* or web browser application 1022) configured to communicate with the search system 902.

In step 1202, the method 1200 includes receiving a search query 1014 (see FIG. 10) from a user. In some implementations, the search application 1024 executing on the user device 904 receives the search query 1014 from the user. In step 1204, the method includes generating and transmitting query wrapper 1006 to the search system 902. In some implementations, the user device 904 generates and transmits the query wrapper 1006 to the search system 902. In step 1206, the method 1200 includes waiting for receipt of the search results 1004. For example, the user device 904 waits for receipt of the search results 1004 from the search system 902. The method 1200 continues to step 1208 when the user device 904 receives the search results 1004 from the search system 902. The search results 1004 may include a list of access mechanisms 1008 and optionally result scores 1010 associated with the access mechanisms 1008. Additionally, the search results 1004 may optionally include link data (e.g., text and/or images) for the access mechanisms 1008. The search application 1024 may generate user selectable links 1002 in the GUI based on the received link data 1002.

In step 1208, the method 1200 includes generating user selectable links 1002 based on the search results 1004. The search application 1024 may generate the user selectable links 1002. In step 1210, the method includes waiting for a user selection of a link 1002. The search application 1024 may wait for the user to select one of the user selectable links 1002 before operation proceeds to step 1212. When the user selects (e.g., touches) one of the links 1002, the method 1200 includes launching an application 1026 associated with the link 1002. For example, in response to selection of a link 1002 including an access mechanism 1008, the user device 904 launches the application 1026 referenced in the access mechanism 1008 and performs one or more operations indicated in the access mechanism 1008 in step 1212.

Figure 13:
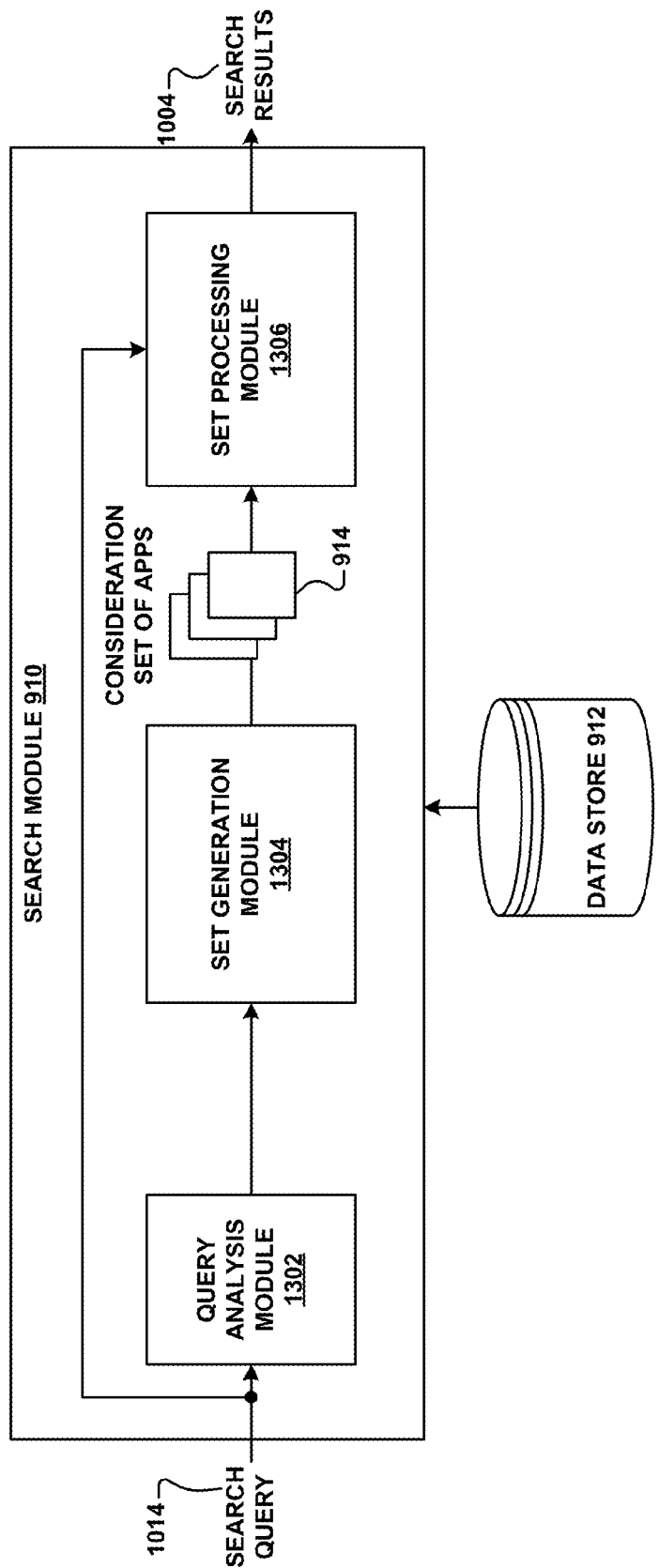
FIG. 13 depicts a search module in some embodiments.

FIG. 13 depicts a search module 910 in some embodiments. The search query 1014 received by the search module 910 is used to perform a search of the data store 912. The query analysis module 1302 receives the search query 1014. The query analysis module 1302 may perform various analysis operations on the received search query 1014. For example, analysis operations performed by the query analysis module 1302 may include, but are not limited to, tokenization of the search query, filtering of the search query, stemming, synonymization, and stop word removal.

The set generation module 1304 identifies a set of application state records (i.e., the consideration set) based on the search query 1014. In some examples, the set generation module 1304 may identify the set of application state records based on matches between terms of the search query 1014 and terms in the application state records. For example, the set generation module 1304 may identify a set of application state records in the data store 912 based on matches between tokens generated by the query analysis module 1302 and words included in the application state records, such as words included in the application state information and/or application state IDs.

The set processing module 1306 processes the consideration set to generate a set of search results 1004 that includes a list of application access mechanisms. In some examples, the set processing module 1306 scores the functions records included in the consideration set. The scores associated with the application state records may be referred to as "result scores." Accordingly, in some examples, each of the application state records in the consideration set may have a corresponding result score. The set processing module 1306 may then select application state records from the consideration set based on the result scores associated with the application state records. For example, the set processing module 1306 may select the highest scoring application state records of the consideration set.

The set processing module 1306 selects application access mechanisms from the selected application state records (e.g., the highest scoring application state records). The set processing module 1306 transmits the selected application access mechanisms to the user device 904 that generated the search query 1014. The set processing module 1306 may also transmit the result scores associated with the selected application access mechanisms. For example, an application access mechanism may be associated with the result score of the application state record from which the application access mechanism was selected.

The information conveyed by the search results 1004 may depend on how the result scores are calculated by the set processing module 1306. For example, the result scores may indicate the relevance of an application function or application state to the search query 1014, the popularity of an application function or state, or other properties of the application function or state, depending on what parameters the set processing module 1306 uses to score the application state records.

The set processing module 1306 may generate result scores for application state records in a variety of different ways. In some implementations, the set processing module 1306 generates a result score for an application state record based on one or more scoring features. The scoring features may be associated with the application state record and/or the search query 1014. An application state record scoring feature (hereinafter "record scoring feature") may be based on any data associated with an application state record. For example, record scoring features may be based on any data included in the application state information of the application state record. Example record scoring features may be a quality score, whether the application state record includes an application access mechanism that leads to a default state or a deeper native application state, and, for newly generated application state records, the number of application state records used to generate the newly generated application state record, as described hereinafter. A query scoring feature may include any data associated with the search query 1014. For example, query scoring features may include, but are not limited to, a number of words in the search query 1014, the popularity of the search query 1014, and the expected frequency of the words in the search query 1014. A record-query scoring feature may include any data that may be generated based on data associated with both the application state record and the search query 1014 that resulted in identification of the application state record by the set generation module 1304. For example, record-query scoring features may include, but are not limited to, parameters that indicate how well the terms of the search query 1014 match the terms of the application state information of the identified application state record. The set processing module 1306 may generate a result score for application state record based on at least one of the record scoring features, the query scoring features, and the record-query scoring features.

The set processing module 1306 may determine a result score based on one or more of the scoring features listed herein and/or additional scoring features not explicitly listed. In some examples, the set processing module 1306 may include one or more machine learning models (e.g., a supervised learning model) configured to receive one or more scoring features. The one or more machine learned models may generate result scores based on at least one of the record scoring features, the query scoring features, and the record-query scoring features. For example, the set processing module 1306 may pair the search query 1014 with each application state record and calculate a vector of features for each (query, record) pair. The vector of features may include one or more record scoring features, one or more query scoring features, and one or more record-query scoring features. The set processing module 1306 may then input the vector of features into a machine-learned regression model to calculate a result score for the application state record. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The result scores 1010 associated with the application state records 914 (e.g., access mechanisms 1008) may be used in a variety of different ways. The set processing module 1306 and/or the user device 904 may rank the access mechanisms 1008 based on the result scores 1010 associated with the access mechanisms 1008. In these examples, a larger result score may indicate that the access mechanism 1008 (e.g., the function or application state) is more relevant to a user than an access mechanism 1008 having a smaller result score. In examples where the user device 904 displays the search results 1004 as a list, the user device 904 may display the links 1002 for access mechanisms 1008 having larger result scores 1010 nearer to the top of the results list (e.g., near to the top of the screen). In these examples, the user device 904 may display the links 1002 for access mechanisms 1008 having lower result scores 1010 farther down the list (e.g., off screen).

FIG. 14 is a block diagram of an exemplary digital device 1400. The digital device 1400 comprises a processor 1402, a memory system 1404, a storage system 1406, a communication network interface 1408, an I/O interface 1410, and a display interface 1412 communicatively coupled to a bus 1414. The processor 1402 is configured to execute executable instructions (e.g., programs). In some embodiments, the processor 1402 comprises circuitry or any processor capable of processing the executable instructions.

The memory system 1404 is any memory configured to store data. Some examples of the memory system 1404 are storage devices, such as RAM or ROM. The memory system 1404 may comprise the cache memory. In various embodiments, data is stored within the memory system 1404. The data within the memory system 1404 may be cleared or ultimately transferred to the storage system 1406.

The storage system 1406 is any storage configured to retrieve and store data. Some examples of the storage system 1406 are flash drives, hard drives, optical drives, and/or magnetic tape. The storage system 1406 may comprise non-transitory media. In some embodiments, the digital device 1400 includes a memory system 1404 in the form of RAM and a storage system 1406 in the form of flash data. Both the memory system 1404 and the storage system 1406 comprise computer readable media which may store instructions or programs that are executable by a computer processor including the processor 1402.

The communication network interface (com. network interface) 1408 may be coupled to a network (e.g., network 108) via the link 1416. The communication network interface 1408 may support communication over an Ethernet connection, a serial connection, a parallel connection, or an ATA connection, for example. The communication network interface 1408 may also support wireless communication (e.g., 802.11a/b/g/n, WiMax). It will be apparent to that the communication network interface 1408 may support many wired and wireless standards.

The optional input/output (I/O) interface 1410 is any device that receives input from the user and output data. The optional display interface 1412 is any device that is configured to output graphics and data to a display. In one example, the display interface 1412 is a graphics adapter. It will be appreciated that not all digital devices 1400 comprise either the I/O interface 1410 or the display interface 1412.

The hardware elements of the digital device 1400 are not limited to those depicted in FIG. 14. A digital device 1400 may comprise more or less hardware elements than those depicted. Further, hardware elements may share functionality and still be within various embodiments described herein. In one example, encoding and/or decoding may be performed by the processor 1402 and/or a co-processor, such as a processor located on a graphics processing unit (GPU).

The above-described functions and components may be comprised of instructions that are stored on a storage medium such as a computer readable medium (e.g., a non-transitory computer readable medium). The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention.

The present invention is described above with reference to exemplary embodiments. Various modifications may be made and other embodiments may be used without departing from the broader scope of the present invention. Therefore, these and other variations upon the exemplary embodiments are intended to be covered by the present invention.

The invention claimed is:

1. A method comprising:
obtaining machine executable code of an application, the application operable to achieve a set of application states;
pre-processing the machine executable code to generate reviewable code;
performing static analysis on the reviewable code to (i) identify, a first state access instruction configured to invoke or assist in invoking a first subset of the set of application states of the application and (ii) identify a set of parameter variables relied on by the first state access instruction to create a template function instruction;
performing dynamic analysis on the application to determine, for each parameter variable of the set of parameter variables, a set of values, wherein the template function instruction is instantiated with first values for the parameter variables to invoke a first state of the first subset of the set of application states of the application;
storing an instantiation of the template function instruction with the first values as an access mechanism for the first state of the application;
storing an instantiation of the template function instruction with second values as an access mechanism for a second state of the application;
executing the application and scraping first data from the first state of the application;
storing a first record for the first state of the application in a search index, wherein the record includes the scraped first data;
executing the application and scraping second data from the second state of the application;
storing a second record for the second state of the application in a search index, wherein the record includes the scraped second data;
in response to receiving a search query from a user device, identifying at least one relevant record from the search index according to scraped data stored in the search index;
in response to the at least one relevant record including the first record, generating a set of search results including a first result, wherein the first result includes the access mechanism for the first state of the application; and
providing the set of search results to the user device, wherein selection by the user of the first result causes the application on the user device to launch and transition to the first state.

2. The method of claim 1, further comprising identifying a candidate activity object from the reviewable code, the candidate activity object potentially functional to change or assist in changing an application state of the set of application states of the application.

3. The method of claim 2, further comprising tracing functions of the candidate activity object in the reviewable code to determine if the candidate activity object is functional to change or assist in changing the application state of the set of application states of the application, an application resource identifier of the first state access instruction indicating the candidate activity object based, at least in part, on the tracing.

4. The method of claim 3, wherein tracing functions of the candidate activity object in the reviewable code comprises identifying a pattern of activity associated with the candidate activity object from the reviewable code to determine if the candidate activity object is functional to change or assist in changing the application state of the set of application states of the application.

5. The method of claim 2, further comprising tracing functions of a parameter variable associated with the candidate activity object from the reviewable code to determine if the parameter variable assists the candidate activity object in changing the application state of the set of application states of the application.

6. The method of claim 5, further comprising determining semantic meaning of the parameter variable by tracing use of the parameter variable in the reviewable code.

7. The method of claim 6, further comprising assigning a category to the parameter variable based on the semantic meaning, the category being associated with a plurality of preexisting values.

8. The method of claim 7, further comprising providing the first state access instruction to the application, the first state access instruction including the candidate activity object and at least one of the plurality of preexisting values.

9. The method of claim 1, wherein the reviewable code is machine readable.

10. The method of claim 1, wherein the first state access instruction comprises a parameter variable utilized by the application resource identifier.

11. The method of claim 1, further comprising generating a state access instruction report including the set of state access instructions.

12. A system comprising a processor and a memory system, wherein the processor is configured to execute instructions from the memory system, wherein the instructions implement:
a pre-processing module configured to obtain machine executable code of an application, the application operable to achieve a set of application states and pre-process the machine executable code to generate reviewable code;
an object tracking module configured to, using static analysis (i) identify, from the reviewable code, a first state access instruction configured to invoke or assist in invoking a first subset of the set of application states of the application and (ii) identify a set of parameter variables relied on by the first state access instruction to create a template function instruction,
a dynamic analysis module configured to perform dynamic analysis on the application to determine, for each parameter variable of the set of parameter variables, a set of values, wherein the template function instruction is instantiated with first values for the parameter variables to invoke a first state of the first subset of the set of application states of the application;
a static access instruction report module configured to store an instantiation of the template function instruction with the first values as an access mechanism for the first state of the application and to store an instantiation of the template function instruction with second values as an access mechanism for a second state of the application;
a scraper engine configured to:
execute the application and scraping first data from the first state of the application;
store a first record for the first state of the application in a search index, wherein the record includes the scraped first data;
execute the application and scraping second data from the second state of the application;
store a second record for the second state of the application in a search index, wherein the record includes the scraped second data;
a set generation module configured to, in response to receiving a search query from a user device, identify at least one relevant record from the search index according to scraped data stored in the search index;
a set processing module configured to, in response to the at least one relevant record including the first record, generate a set of search results including a first result and provide the set of search results to the user device, wherein the first result includes the access mechanism for the first state of the application, and
wherein selection by the user of the first result causes the application on the user device to launch and transition to the first state.

13. The system of claim 12, further comprising an object identification module configured to identify a candidate activity object from the reviewable code, the candidate activity object potentially functional to change or assist in changing an application state of the set of application states of the application.

14. The system of claim 13, the object tracking module being further configured to trace functions of the candidate activity object in the reviewable code to determine if the candidate activity object is functional to change or assist in changing the application state of the set of application states of the application, an application resource identifier of the first state access instruction indicating the candidate activity object based, at least in part, on the tracing.

15. The system of claim 14, the object tracking module being further configured tracing functions of the candidate activity object in the reviewable code comprises the object tracking module configured to identify a pattern of activity associated with the candidate activity object from the reviewable code to determine if the candidate activity object is functional to change or assist in changing the application state of the set of application states of the application.

16. The system of claim 13, the object tracking module being further configured to trace functions of a parameter variable associated with the candidate activity object from the reviewable code to determine if the parameter variable assists the candidate activity object in changing the application state of the set of application states of the application.

17. The system of claim 16, further comprising a static semantic module configured to determine semantic meaning of the parameter variable by tracing use of the parameter variable in the reviewable code.

18. The system of claim 17, the static semantic module being further configured to assign a category to the parameter variable based on the semantic meaning, the category being associated with a plurality of preexisting values.

19. The system of claim 18, the static access instruction report module being further configured to provide the first state access instruction to the application, the first state access instruction including the candidate activity object and at least one of the plurality of preexisting values.

20. The system of claim 12, wherein the reviewable code is machine readable.

21. The system of claim 12, wherein the first state access instruction comprises a parameter variable utilized by the application resource identifier.

22. The system of claim 12, further comprising generating a state access instruction report including the set of state access instructions.

23. A non-transitory computer readable medium comprising executable instructions, the instructions being executable by a data processing device to perform a method, the method comprising:

obtaining machine executable code of an application, the application operable to achieve a set of application states;

pre-processing the machine executable code to generate reviewable code;

performing static analysis on the reviewable code to (i) identify a first, state access instruction configured to invoke or assist in invoking a first subset of the set of application states of the application and (ii) identify a set of parameter variables relied on by the first state access instruction to create a template function instruction, performing dynamic analysis on the application to determine, for each parameter variable of the set of parameter variables, a set of values, wherein the template function instruction is instantiated with first values for the parameter variables to invoke a first state of the first subset of the set of application states of the application;

storing an instantiation of the template function instruction with the first values as an access mechanism for the first state of the application;

storing an instantiation of the template function instruction with second values as an access mechanism for a second state of the application;

executing the application and scraping first data from the first state of the application;

storing a first record for the first state of the application in a search index, wherein the record includes the scraped first data;

executing the application and scraping second data from the second state of the application;

storing a second record for the second state of the application in a search index, wherein the record includes the scraped second data;

in response to receiving a search query from a user device, identifying at least one relevant record from the search index according to scraped data stored in the search index;

in response to the at least one relevant record including the first record, generating a set of search results including a first result, wherein the first result includes the access mechanism for the first state of the application; and providing the set of search results to the user device, wherein selection by the user of the first result causes the application on the user device to launch and transition to the first state.

* * * * *